US012379879B2

(12) United States Patent
Sasidharan et al.

(10) Patent No.: US 12,379,879 B2
(45) Date of Patent: Aug. 5, 2025

(54) EFFICIENT UPLOADING OF FILES TO A STORAGE SERVICE

(71) Applicant: Citrix Systems, Inc., Fort Lauderdale, FL (US)

(72) Inventors: Karthik Sasidharan, Cary, NC (US); Rakesh Kumar, Cary, NC (US)

(*) Notice: Subject to any disclaimer, the term of this patent is extended or adjusted under 35 U.S.C. 154(b) by 618 days.

(21) Appl. No.: 17/705,454

(22) Filed: Mar. 28, 2022

(65) Prior Publication Data

US 2023/0305757 A1 Sep. 28, 2023

(51) Int. Cl.
*G06F 15/173* (2006.01)
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
None
See application file for complete search history.

(56) References Cited

U.S. PATENT DOCUMENTS

| 10,015,205 | B1* | 7/2018 | Cohen | H04L 67/02 |
| 2014/0019635 | A1* | 1/2014 | Reznik | H04L 63/0428 |
| | | | | 709/231 |
| 2017/0123864 | A1* | 5/2017 | Knotts | H04L 69/28 |
| 2017/0230260 | A1* | 8/2017 | Gueta | H04L 67/02 |
| 2025/0139280 | A1* | 5/2025 | Ancin | G06F 21/6209 |

* cited by examiner

*Primary Examiner* — Phuoc H Nguyen

(57) ABSTRACT

A computing system may (A) determine that a target service is to receive portions of a first file in a particular sequence from the computing system via a first hypertext transport protocol (HTTP) connection between the computing system and the target service, (B) receive a first portion of the first file from a client device via a second HTTP connection established between the computing system and the client device, (C) determine that the first portion of the first file is next in the particular sequence of file portions to be sent to the target service, (D) send, to the target service via the first HTTP connection, the first portion of the first file based at least in part on the first portion of the first file being next in the particular sequence, (E) receive a second portion of the first file from the client device via a third HTTP connection established between the computing system and the client device, (F) determine that the second portion of the first file is next in the particular sequence, and (G) send to the target service via the first HTTP connection, the second portion of the first file based at least in part on the second portion of the first file being next in the particular sequence.

18 Claims, 16 Drawing Sheets

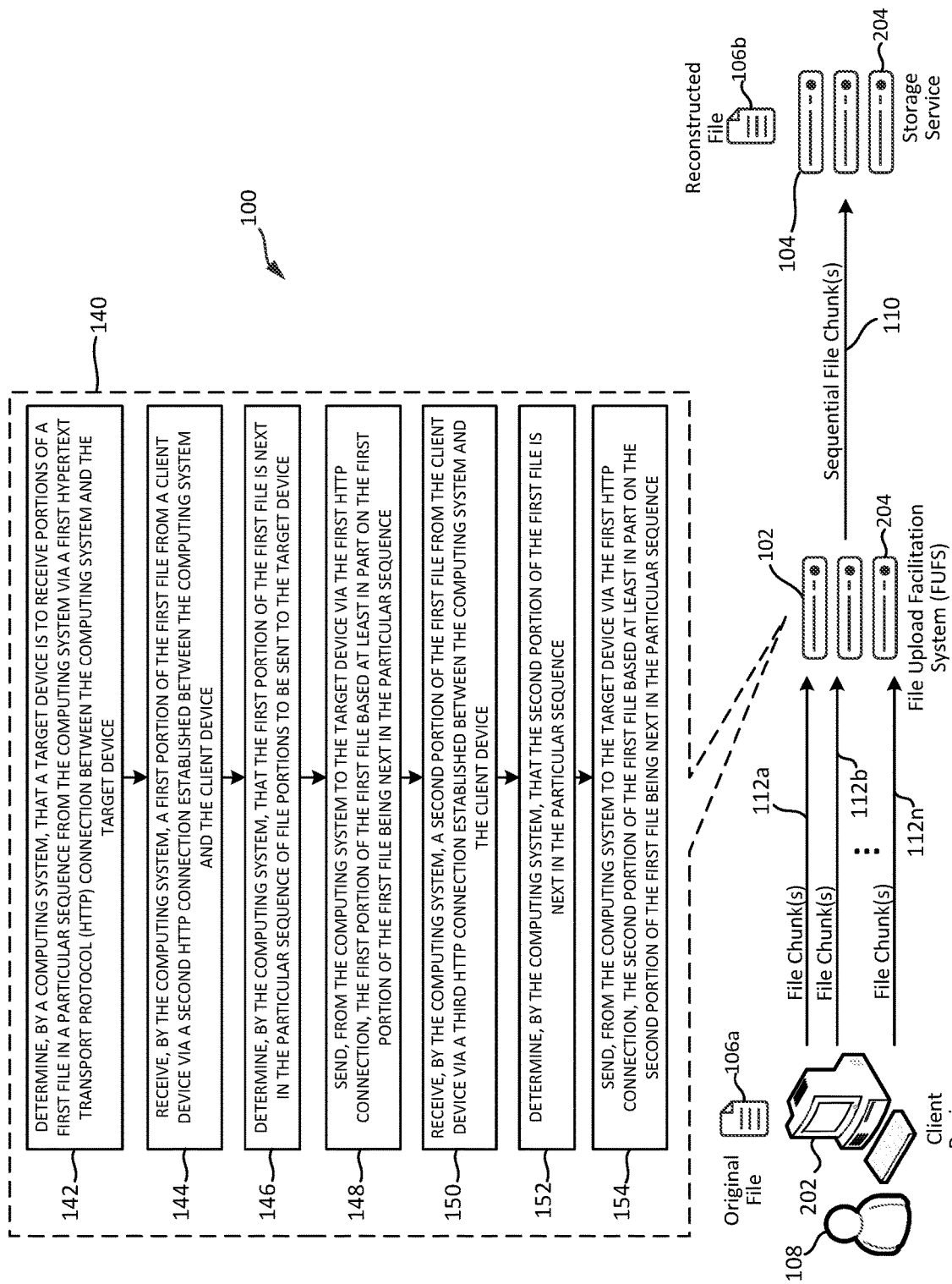

Upload Session Object Table

| Entry ID | Upload Session Object | Upload Status |
|---|---|---|
| 0001 | USO1 | Complete |
| 0002 | USO2 | Complete |
| 0003 | USO3 | In Progress |
| | | |
| | | |
| | | |
| | | |
| | | |

| Session ID | Service ID | Content List | Next Expected Starting Byte | File Size | Upload Status |
|---|---|---|---|---|---|
| 0001 | ServiceIDA | ContentListA | 0 | 250 MB | In Progress |

602, 604, 606, 608, 610, 612

Upload Session Object

| Start Index | End Index | Content |
|---|---|---|
| 0 | 99 | ContentA |

126, 128, 130

Partial File Content Record

| Entry ID | Service ID | Upload Configuration |
|---|---|---|
| 001 | OneDrive | Sequential |
| 002 | GoogleDrive | Parallel |
| 003 | DropBox | Sequential |
|  |  |  |
|  |  |  |
|  |  |  |
|  |  |  |

Storage Service Configuration Table

FIG. 11

EFFICIENT UPLOADING OF FILES TO A STORAGE SERVICE

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises determining, by a computing system, that a target service is to receive portions of a first file in a particular sequence from the computing system via a first hypertext transport protocol (HTTP) connection between the computing system and the target service; receiving, by the computing system, a first portion of the first file from a client device via a second HTTP connection established between the computing system and the client device; determining, by the computing system, that the first portion of the first file is next in the particular sequence of file portions to be sent to the target service; sending, from the computing system to the target service via the first HTTP connection, the first portion of the first file based at least in part on the first portion of the first file being next in the particular sequence; receiving, by the computing system, a second portion of the first file from the client device via a third HTTP connection established between the computing system and the client device; determining, by the computing system, that the second portion of the first file is next in the particular sequence; and sending, from the computing system to the target service via the first HTTP connection, the second portion of the first file based at least in part on the second portion of the first file being next in the particular sequence.

In some embodiments, a computing system comprises at least one processor, and at least one computer-readable medium encoded with instructions which, when executed by the at least one processor, cause the computing system to determine that a target service is to receive portions of a first file in a particular sequence from the computing system via a first hypertext transport protocol (HTTP) connection between the computing system and the target service, to receive a first portion of the first file from a client device via a second HTTP connection established between the computing system and the client device, to determine that the first portion of the first file is next in the particular sequence of file portions to be sent to the target service, to send, to the target service via the first HTTP connection, the first portion of the first file based at least in part on the first portion of the first file being next in the particular sequence, to receive a second portion of the first file from the client device via a third HTTP connection established between the computing system and the client device, to determine that the second portion of the first file is next in the particular sequence, and to send, to the target service via the first HTTP connection, the second portion of the first file based at least in part on the second portion of the first file being next in the particular sequence.

In some embodiment, at least one non-transitory computer-readable medium is encoded with instructions which, when executed by at least one processor of a computing system, cause the computing system to determine that a target service is to receive portions of a first file in a particular sequence from the computing system via a first hypertext transport protocol (HTTP) connection between the computing system and the target service, to receive a first portion of the first file from a client device via a second HTTP connection established between the computing system and the client device, to determine that the first portion of the first file is next in the particular sequence of file portions to be sent to the target service, to send, to the target service via the first HTTP connection, the first portion of the first file based at least in part on the first portion of the first file being next in the particular sequence, to receive a second portion of the first file from the client device via a third HTTP connection established between the computing system and the client device, to determine that the second portion of the first file is next in the particular sequence, and to send, to the target service via the first HTTP connection, the second portion of the first file based at least in part on the second portion of the first file being next in the particular sequence.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1A shows an example system configured to provide efficient uploading of files to a storage service in accordance with some aspects of the present disclosure;

FIG. 5 shows an example upload session object table that may be accessed by the FUFS shown in FIGS. 1A and 1B; and FIG. 6 shows an example upload session object that may be created and accessed by the FUFS shown in FIGS. 1A and 1B; and FIG. 7 shows an example partial file content record that may be created and accessed by the FUFS shown in FIGS. 1A and 1B; FIG. 11 shows examples of specific entries that may be written to the storage service configuration table shown in FIGS. 9 and 10.

DETAILED DESCRIPTION

Figure 1B:
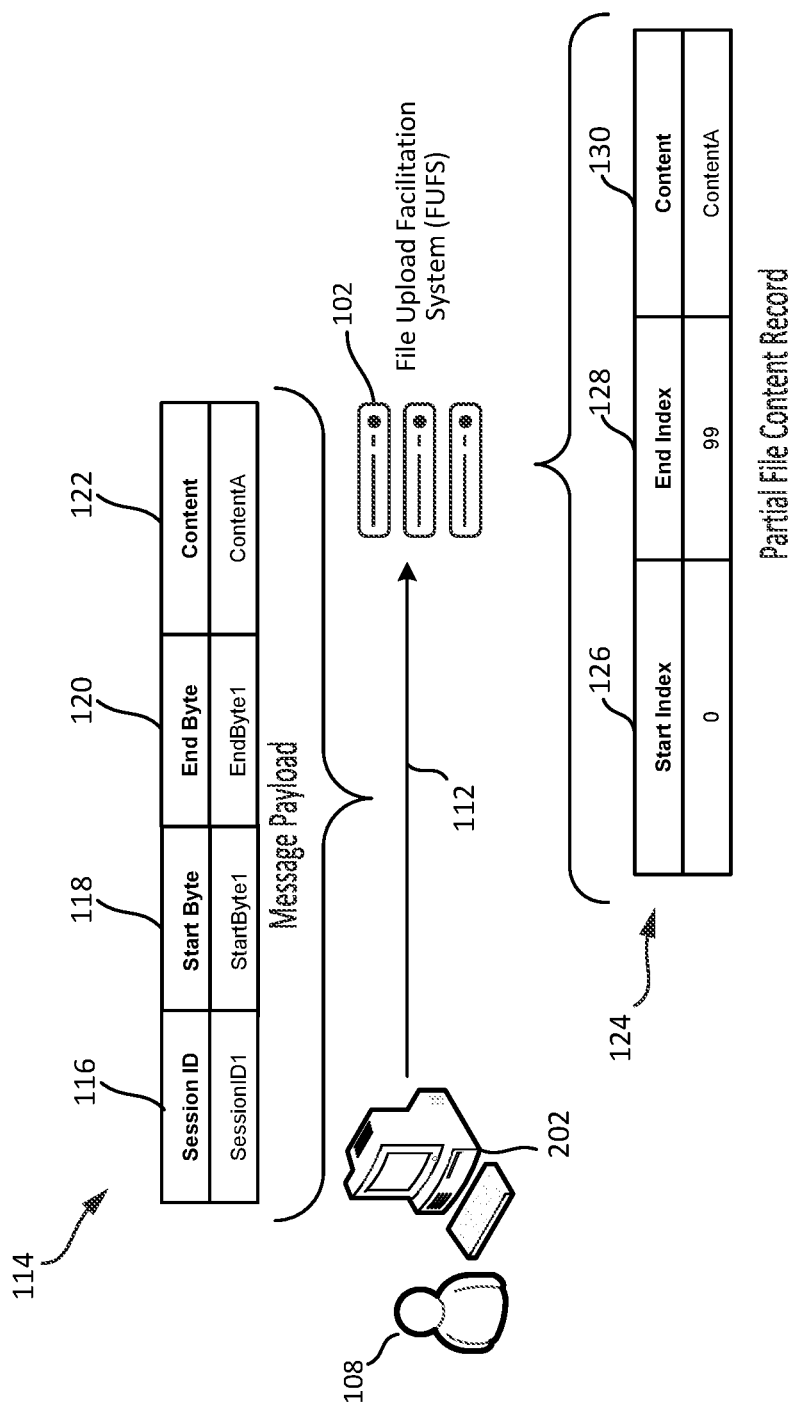
FIG. 1B shows an example message payload that may be used to communicate a portion of a file from a client device to the file upload facilitation system (FUFS) shown in FIG. 1A.

For purposes of reading the description of the various embodiments below, the following descriptions of the sections of the specification and their respective contents may be helpful:

Section A provides an introduction to example embodiments of a system configured to provide efficient uploading of files to a storage service in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E provides a more detailed description of example embodiments of the system introduced in Section A; and Section F describes example implementations of methods, systems/devices, and computer-readable media in accordance with the present disclosure.

A. Introduction to Illustrative Embodiments of a System Configured to Provide Efficient Uploading of Files to a Storage Service Various storage services exist for storing files on behalf of client devices. Examples of such storage services include OneDrive, iCloud, Drive, GoogleDrive, DropBox, ShareFile®, etc. Some such storage services are configured to require the entirety of a given file to be streamed to the service, in sequentially ordered portions (referred to herein as "chunks"), via a single hypertext transport protocol (HTTP) connection. OneDrive is an example of a storage service configured in such manner. With such services, a client device can transmit only a single chunk of a file to the service at a time, and cannot begin transmitting a given chunk to the service until the entirety of the immediately preceding chunk has been successfully transmitted. The inventors have recognized and appreciated that such sequential uploads of file chunks over a single HTTP connection presents several drawbacks, especially in scenarios where the file to be uploaded is large (e.g., 100 MB or greater). For example, because the client device must wait for an acknowledgment of completion of the uploading of a preceding chunk before beginning upload of the next chunk, inefficiencies can result when the preceding chunk fails to upload properly and/or where the HTTP connection experiences connection issues/failures. Such inefficiencies can be exacerbated when the quality of the network connection between the client device and the storage service is less than optimal, e.g., due to a large distance and/or complex network pathway between the client device and the storage service.

Offered are systems and techniques for improving the efficiency with which files can be uploaded to storage services, such as OneDrive, that require the sequential streaming of file chunks via a single HTTP connection, by introducing an additional computing system that acts as an intermediary between a client device and a target storage service. Advantageously, the intermediate computing system may be configured to receive respective file chunks from a client device, in parallel, via multiple HTTP connections, and may further be configured to take responsibility for ensuring that those chunks are subsequently transferred to a target storage service in the correct sequence. Because, in such a configuration, the client device is permitted to send file chunks out of sequence via different HTTP connections, a delay experienced while transmitting a particular chunk via one HTTP connection will not impact the client's ability to transmit a different chunk via another HTTP connection. Further, in some implementations, the intermediate computing system may be located such that the quality of the network connection between the intermediate computing system and the target storage service is high, thus minimizing delays that might otherwise be experienced due to the sequential streaming requirement of the target storage service. And still further, in some implementations, the intermediate computing system may additionally be configured to interact with other storage services that do allow file chunks to be sent, out of order, via multiple, parallel HTTP connections. As such, in such implementations, the client device may interact exclusively with the intermediate computing system (via multiple, parallel HTTP connections) to effect a file upload to any of multiple storage services, and the intermediate computing system can then be responsible for interacting with a given target storage service in the correct manner.

FIG. 1A shows an example system 100 configured to provide efficient uploading of files to a storage service 104 in accordance with aspects of the present disclosure. As shown, in some implementations, the system 100 may include a file upload facilitation system (FUFS) 102 that acts as an intermediary between a client device 202 and the storage service 104 to enable the efficient uploading of a file 106 from the client device 202 to the storage service 104. As illustrated, in some implementations, the FUFS 102 and the storage service 104 may each be implemented using one or more servers 204. Several example configurations of suitable client devices 202 and servers 204 are described in detail below in Sections B-D.

Referring to FIG. 1A, a user 108 may operate the client device 202 to initiate uploading of the file 106 to the storage service 104. As described in detail below, the client device 202 may divide an original copy 106a of the file 106 into multiple chunks, and the FUFS 102 may facilitate the transfer of those chunks to the storage service 104 where they may be reassembled into a reconstructed copy 106b of the file 106. In some implementations, the storage service 104 may be of the type that requires chunks of the file 106 to be sent, in sequence, via a single HTTP connection 110, as described above. As shown in FIG. 1A, rather than sending the chunks of the file 106 directly to the storage service 104, the client device 202 may instead establish multiple HTTP connections 112a, 112b, etc., with the FUFS 102, and may send the chunks of the file 106 to the FUFS 102 via those multiple HTTP connections 112.

In some implementations, the FUFS 102 may track the chunks of the file 106 it receives from the client device 202, and may send respective chunks to the storage service 104, in the correct sequential order, via the single HTTP connection 110 as those chunks become available to the FUFS 102. To enable the FUFS 102 to determine when it has received the next chunk of the file 106 that is expected by the storage service 104, the individual chunks of the file 106 that the client device 202 sends to the FUFS 102 may be accompanied by indicators (e.g., address offsets, ordinal identifiers, etc.) of the relative positions of the respective chunks within the file 106. The FUFS 102 may thus reorder the chunks of the file 106 it receives from the client device 202, as needed, to ensure that the chunks are sent to the storage service 104 in the correct order. Further, although not illustrated in FIG. 1A, if the storage service 104 is instead configured to receive chunks of the file 106 via multiple HTTP connections, then the FUFS 102 may instead act as a pass-through for the client device 202, and may send the chunks of the file 106 to the storage service 104 as soon as they are received from the client device 202, i.e., without waiting until the next chunk in the sequence becomes available. As such, using the techniques described herein, the FUFS 102 may receive chunks of the file 106 from the client device 202 in parallel over a plurality of HTTP connections 112 and may upload those chunks of the file 106 to the storage service 104 according to the particular upload process the storage service 104 supports.

Providing such an intermediate computing system, e.g., the FUFS 102, to facilitate file uploads to a storage service 104 may provide significant benefits, as it allows for more efficient usage of the network bandwidth available to the client device 202. For example, in the event that one or more of the HTTP connections 112 between the client device 202 and the FUFS 102 experiences connection issues, upload failure, or any other issue(s) with respect to uploading one or more chunks of the file 106 to the FUFS 102, the bandwidth not presently being used by the one or more HTTP connections experiencing the issue(s) may instead be used by the remaining HTTP connection(s) to upload other chunks of the file 106. Further, in some implementations, use of the FUFS 102 may also enable enhanced control over retrying of an upload of a chunk of the file 106 that fails to upload to the FUFS 102. These benefits may result in a faster upload of the file 106 to the storage service 104 over the traditional approach of sequentially uploading chunks of a file directly to the storage service 104 via a single HTTP connection between the client device 202 and the storage service 104.

FIG. 1A further shows an example routine 140 that may be performed by the FUFS 102 in accordance with some aspects of the present disclosure. As shown, the routine 140 may begin at a step 142, at which the FUFS 102 may determine that a storage service 104 is to receive portions of a first file (e.g., chunks of the file 106) in a particular sequence from the FUFS 102 via a first HTTP connection (e.g., the HTTP connection 110) between the FUFS 102 and the storage service 104. The portions of the first file (e.g., the chunks of the file 106) may be of varying sizes or of equal size (e.g., "100" bytes). The portions of the first file (e.g., the chunks of the file 106) may be sent from the client device 202 to the FUFS 102 in any order. The portions of the first file (e.g., the chunks of the file 106) may also be received by the FUFS 102 at various times/intervals.

In some implementations, the FUFS 102 may determine that the FUFS 102 is to send the portions of the first file (e.g., the chunks of the file 106) to the storage service 104 in the particular sequence and via the first HTTP connection (e.g., the HTTP connection 110) based at least in part on entries in a storage service configuration table 900 (described in detail below in connection with FIGS. 9-11). In other implementations, the FUFS 102 may additionally or alternatively determine that the FUFS 102 is to send the portions of the first file (e.g., the chunks of the file 106) to the storage service 104 in the particular sequence and via the first HTTP connection (e.g., the HTTP connection 110) based at least in part on information the FUFS 102 receives from the client device 202. For example, the FUFS 102 may receive, from the client device 202 and via an HTTP connection between the FUFS 102 and the client device 202, a message indicating that the FUFS 102 is to send portions of the first file (e.g., the chunks of the file 106) in the particular sequence to the storage service 104.

In some implementations, the FUFS 102 may perform the step 142 of the routine 140 in response to receiving a file upload request from the client device 202. Such a file upload request may, for example, include an indication of a size of the first file (e.g., the file 106) and an identifier of the storage service 104 to which the FUFS 102 is to send the first file (e.g., the file 106). The identifier of the storage service 104 may take on any of numerous forms. In some implementations, for example, the identifier may include one or more of a unique name or other alphanumeric identifier of the storage service 104 that is assigned by a system administrator or otherwise, a uniform resource locator (URL) for the storage service 104, an Internet Protocol (IP) address for the storage service 104, a unique name of the storage service 104, etc.

In some implementations, in response to determining that the storage service 104 is to receive portions of the first file (e.g., chunks of the file 106) in the particular sequence from the FUFS 102 via the first HTTP connection (e.g., the HTTP connection 110), the FUFS 102 may create an upload session object 600 (shown in FIG. 6) and may store that upload session object 600 in an upload session object table 500 (shown in FIG. 5). As described in detail in Section E below, the FUFS 102 may use the upload session object 600 to temporarily catalog and store received chunks of a file 106 as they are received from the client device 202, at least until those chunks are subsequently forwarded to the storage service 104 in the correct sequence.

At a step 144 of the routine 140, the FUFS 102 may receive a first portion of the first file (e.g., a first chunk of the file 106) from the client device 202 via a second HTTP connection (e.g., the HTTP connection 112a) established between the FUFS 102 and the client device 202. An example message payload 114 that may be used to communicate the first portion of the first file (e.g., the first chunk of the file 106) from the client device 202 to the FUFS 102 is shown in FIG. 1B. As shown, in some implementations, the message payload 114 may include a session identifier (ID) 116 associated with the particular upload session of the first file (e.g., the file 106), an indication 118 of the starting byte of the first portion (e.g., the first chunk) within the first file (e.g., the file 106), an indication 120 of the ending byte of the first portion (e.g., the first chunk) within the first file (e.g., the file 106), and content 122 corresponding to the portion of the first file (e.g., the first chunk of the file 106).

As illustrated in FIG. 1B, in some implementations, the FUFS 102 may use the message payload 114 received from the client device 202 to generate a partial file content record 124 corresponding to the first portion of the first file (e.g., the first chunk of the file 106). For example, FUFS 102 may generate a "start byte" entry 126 of the partial file content 124 based on the "start byte" entry 118 in the message payload 114, may generate an "end byte" entry 128 of the partial file content 124 based on the "end byte" entry 120 in the message payload 114, and may generate a "content" entry 130 of the partial file content 124 based on the "content" entry 122 in the message payload 114.

As explained in detail in Section E, in some implementations, the partial file content records 124 that are so generated may be used to populate a content list 800 (shown in FIG. 8) for an upload session object 600 (shown in FIG. 6) for the first file (e.g., the file 106). In some implementations, the FUFS 102 may determine the upload session object 600 to which the partial file content 124 is to be added by comparing the "session ID" entry 116 in the message payload 114 with "session ID" entries 602 for the upload session objects 600 in the upload session object table 500.

At a step 146 of the routine 140, the FUFS 102 may determine that the first portion of the first file (e.g., the first chunk of the file 106) is next in the particular sequence of file portions that are to be sent to the storage service 104. For example, as described in more detail in Section E, in some implementations, the FUFS 102 may compare the "start byte" entry 126 of the partial file content 124 generated by the FUFS 102 using the first portion of the file (e.g., the first chunk of the file 106) with the "next expected starting byte" entry 608 of the upload session object 600 (shown in FIG. 6) associated with the first file (e.g., the file 106) to determine whether those values match. As Section E explains, in some implementations, each time the FUFS 102 sends a chunk of the file 106 to the storage service 104, the FUFS 102 may update the "next expected starting byte" entry 608 to identify the starting byte of the next chunk that is to be sent to the storage service 104. As such, a match between the "start byte" entry 126 of the partial file content 124 and the "next expected starting byte" entry 608 of the upload session object 600 (shown in FIG. 6) may indicate that the first portion of the first file (e.g., the first chunk of the file 106) is next in the particular sequence of file portions that are to be sent to the storage service 104.

At a step 148 of the routine 140, the FUFS 102 may send, from the FUFS 102 to the storage service 104 via the first HTTP connection (e.g., the HTTP connection 110), the first portion of the first file (e.g., the first chunk of the file 106) based at least in part on the first portion of the first file being next in the particular sequence. In some implementations, the FUFS 102 may await an acknowledgement from the storage service 104 indicating that the storage service 104 successfully received the first portion of the file (e.g., the first chunk of the file 106) before sending the next portion in the sequence.

In some implementations, after the FUFS 102 sends the first portion of the first file (e.g., the first chunk of the file 106) to the storage service 104 and receives the acknowledgement from the storage service 104, the FUFS 102 may remove the partial file content 124 corresponding to the first portion of the first file from the content list 800 of the upload session object 600. In some implementations, after the FUFS 102 removes the partial file content record 124 from the content list 800, the FUFS 102 may cause the content list 800 to be re-ordered according to the particular sequence.

At a step 150 of the routine 140, the FUFS 102 may receive a second portion of the first file (e.g., a second chunk of the file 106) from the client device 202 via a third HTTP connection (e.g., the HTTP connection 112b) established between the FUFS 102 and the client device 202.

At a step 152 of the routine 140, the FUFS 102 may determine that the second portion of the first file (e.g., the second chunk of the file 106) is next in the particular sequence of file portions to be sent to the storage service 104.

At a step 154 of the routine 140, the FUFS 102 may send, from the FUFS 102 to the storage service 104 via the first HTTP connection (e.g., the HTTP connection 110), the second portion of the first file (e.g., the second chunk of the file 106) based at least in part on the second portion of the first file being next in the particular sequence.

In some implementations, after all portions of the first file (e.g., the file 106) have been sent from the FUFS 102 to the storage service 104, the FUFS 102 may remove all of the partial file contents 124 included in the content list 800 of the upload session object 600 from storage. In some implementations, the FUFS 102 may keep the upload session object 600 corresponding to the first file (e.g., the file 106) in the upload session object table 500 so that the FUFS 102 may identify that the first file was successfully uploaded to the storage service 104. In some implementations, the FUFS 102 may change the "upload status" entry 612 of the upload session object 600 to "complete" after the first file (e.g., the file 106) has been successfully uploaded to the storage service 104. In some implementations, the FUFS 102 may remove the upload session object 600 corresponding to the first file (e.g., the file 106) from the upload session object table 500 once a particular period of time after the first file has been successfully sent to the storage service 104 has elapsed. In some implementations, the FUFS 102 may remove the upload session object 600 from the upload session object table 500 as soon as the first file (e.g., the file 106) has been successfully uploaded to the storage service 104. In some implementations, after successfully sending the first file (e.g., the file 106) to the storage service 104, the FUFS 102 may send an indication to the client device 202 that the first file was successfully uploaded to the storage service 104.

Additional details and example implementations of embodiments of the present disclosure are set forth below in Section E, following a description of example systems and network environments in which such embodiments may be deployed.

B. Network Environment

Figure 2:
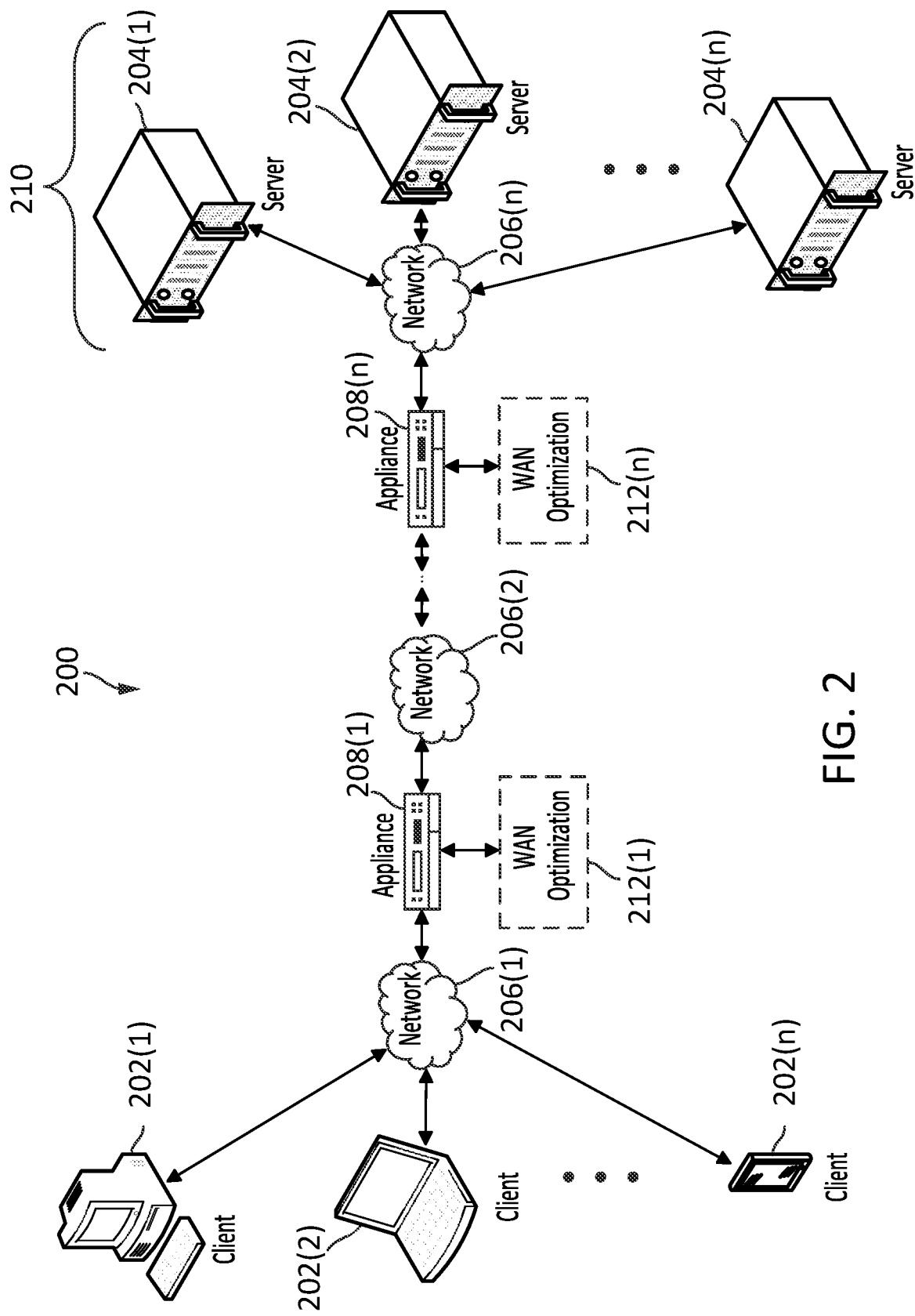
FIG. 2 is a diagram of a network environment in which some embodiments of the system disclosed herein may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network (s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
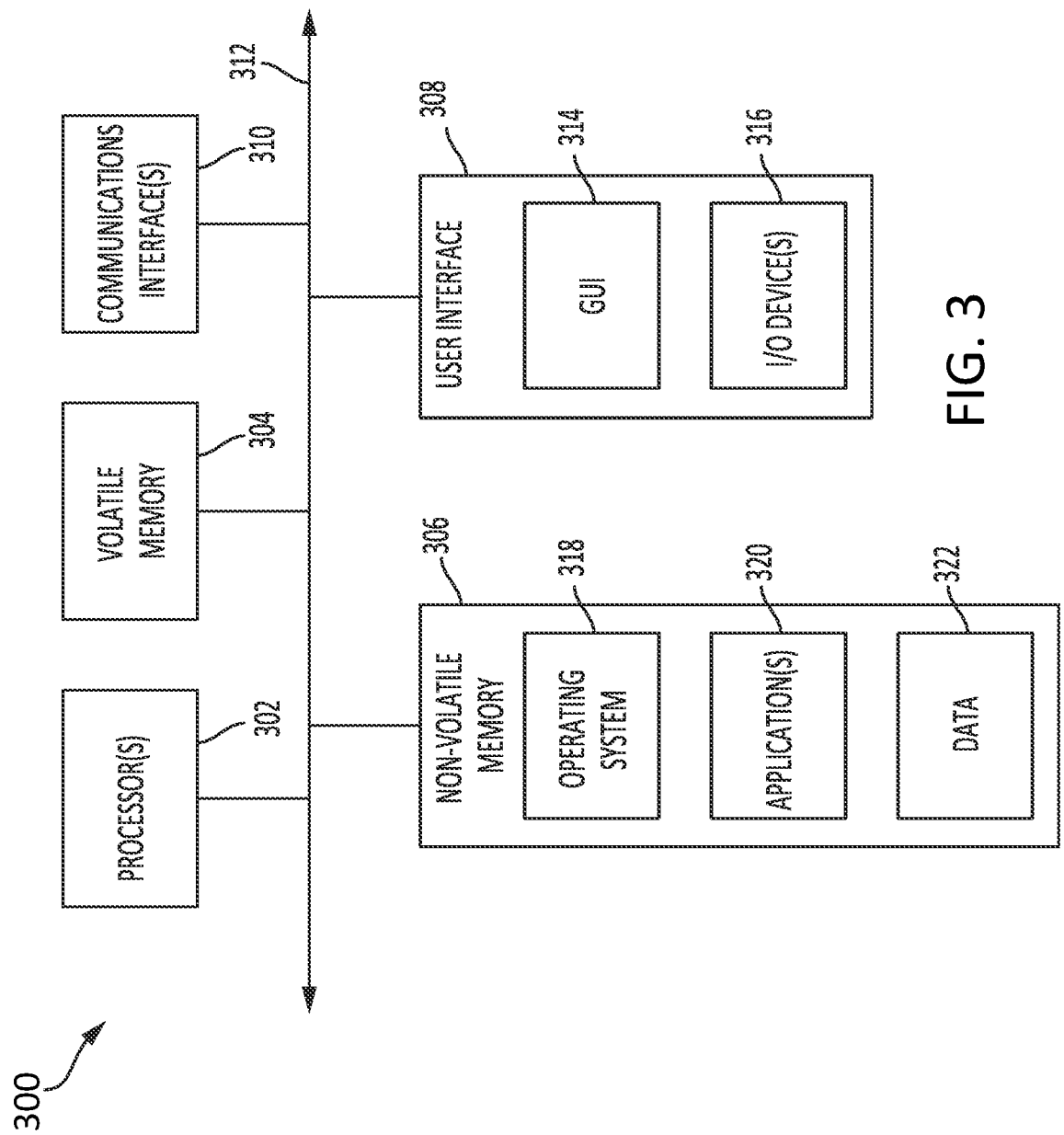
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication with the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
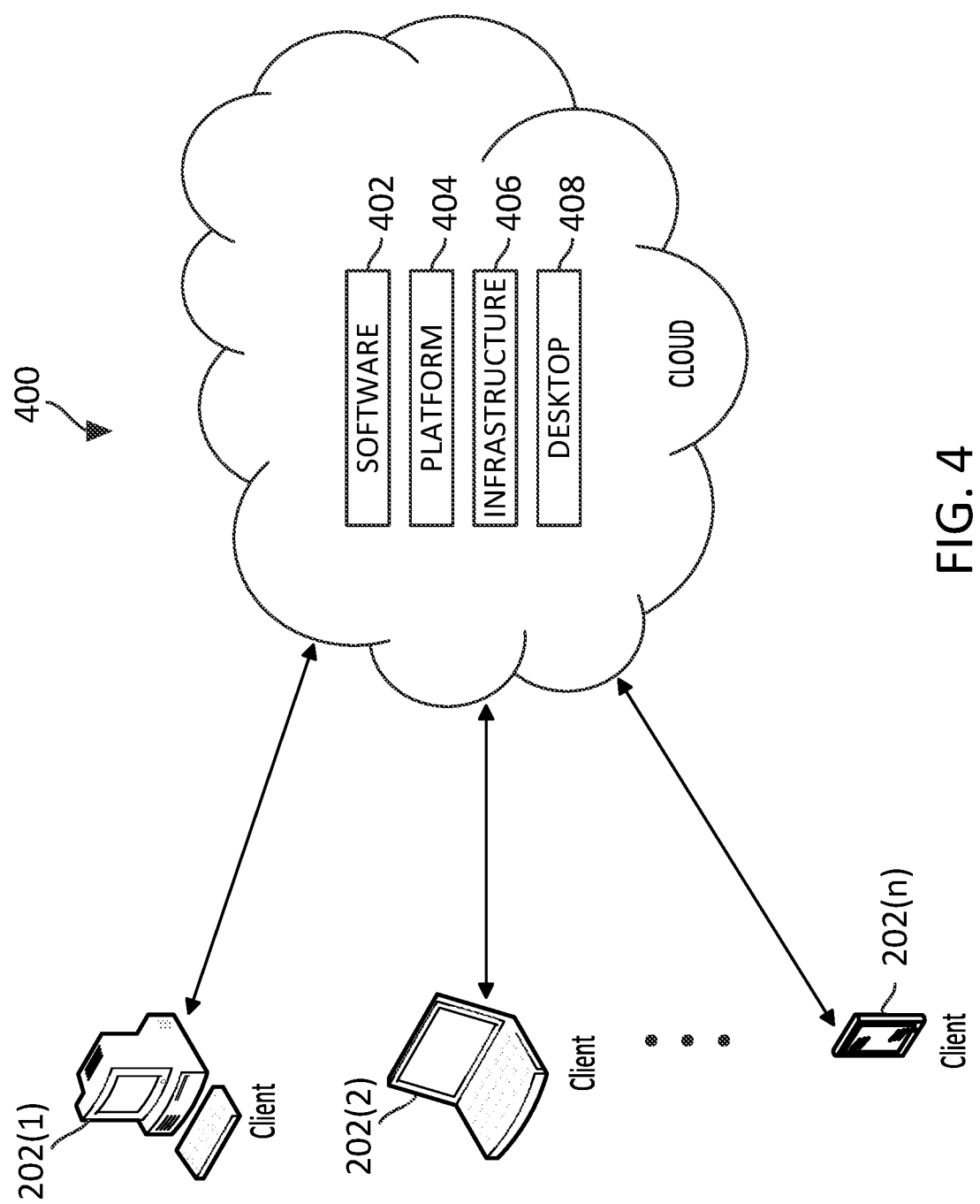
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc., of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc., of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc., of San Francisco, California, or OFFICE 365 provided by Microsoft Corporation. Examples of SaaS may also include data storage providers, e.g. Citrix ShareFile® from Citrix Systems, DROPBOX provided by Dropbox, Inc., of San Francisco, California, Microsoft SKYDRIVE provided by Microsoft Corporation, Google Drive provided by Google Inc., or Apple ICLOUD provided by Apple Inc., of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Detailed Description of Example Embodiments of the System Introduced in Section A Section A introduced various systems and techniques for providing efficient uploading of files to a storage service. For instance, as Section A explains in connection with FIGS. 1A and 1B, in some implementations, the FUFS 102 may (A) determine that the storage service 104 is to receive portions of a first file (e.g., chunks of the file 106) in a particular sequence from the FUFS 102 via a first HTTP connection (e.g., the HTTP connection 110) between the FUFS 102 and the storage service 104, (B) receive a first portion of the first file (e.g., a first chunk of the file 106) from the client device 202 via a second HTTP connection (e.g., the HTTP connection 112a) established between the FUFS 102 and the client device 202, (C) determine that the first portion of the first file (e.g., the first chunk of the file 106) is next in the particular sequence of file portions that are to be sent to the storage service 104, (D) send, from the FUFS 102 to the storage service 104 via the first HTTP connection (e.g., the HTTP connection 110), the first portion of the file (e.g., the first chunk of the file 106) based at least in part on the first portion of the first file being next in the particular sequence, (E) receive a second portion of the first file (e.g., a second chunk of the file 106) from the client device 202 via a third HTTP connection (e.g., the HTTP connection 112b) established between the FUFS 102 and the client device 202, (F) determine that the second portion of the first file (e.g., a second chunk of the file 106) is next in the particular sequence of file portions to be sent to the storage service 104, and (G) send, from the FUFS 102 to the storage service 104 via the first HTTP connection (e.g., the HTTP connection 110), the second portion of the file (e.g., the second chunk of the file 106) based at least in part on the second portion of the first file being next in the particular sequence.

FIG. 11 shows an example storage service configuration table 900 that may be used by the FUFS 102. As shown, in some implementations, the storage service configuration table 900 may include "entry ID" entries 902, "service ID" entries 904, and "upload configuration" entries 906.

In some implementations, the "entry ID" entries 902 may serve to uniquely identify rows of the storage service configuration table 900.

In some implementations, the "service ID" entries 904 may indicate the names of the individual storage services (e.g., the storage service 104) to which the FUFS 102 is to send portions of the files (e.g., chunks of the file 106).

In some implementations, the "upload configuration" entries 906 may indicate upload configurations for the storage services 104 identified by the corresponding "service ID" entries 904. For example, as shown in FIG. 11, for storage services 104 that support only sequential uploads via a single HTTP connection, the "upload configuration" entries 906 may indicate "sequential," whereas for storage services 104 that support parallel uploads via a plurality of HTTP connections, the "upload configuration" entries 906 may instead indicate "parallel."

Figure 9:
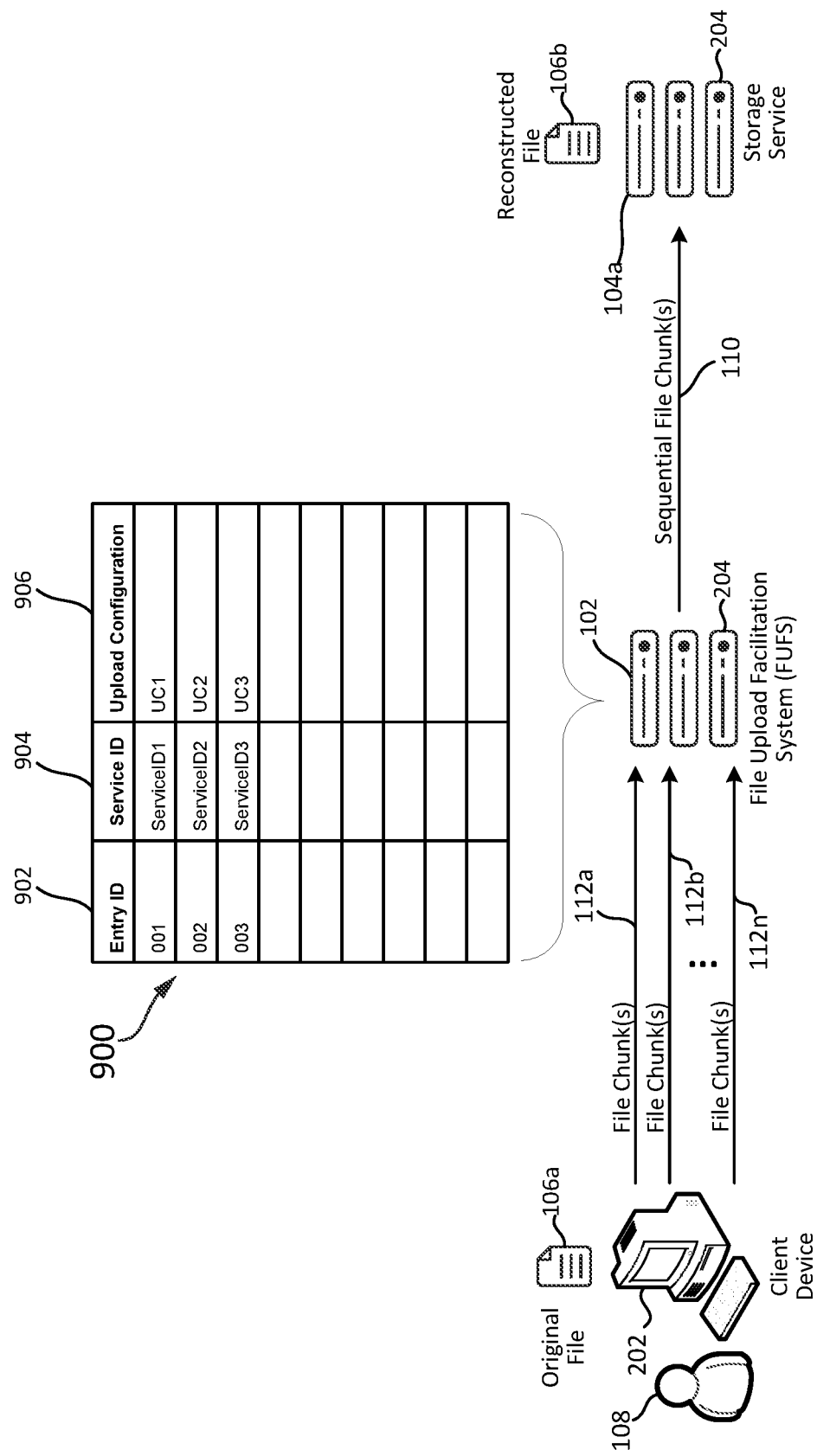
FIG. 9 shows how the FUFS shown in FIGS. 1A and 1B may upload portions of a file sequentially to a storage service based on contents of a storage service configuration table in accordance with some aspects of the present disclosure.
Figure 10:
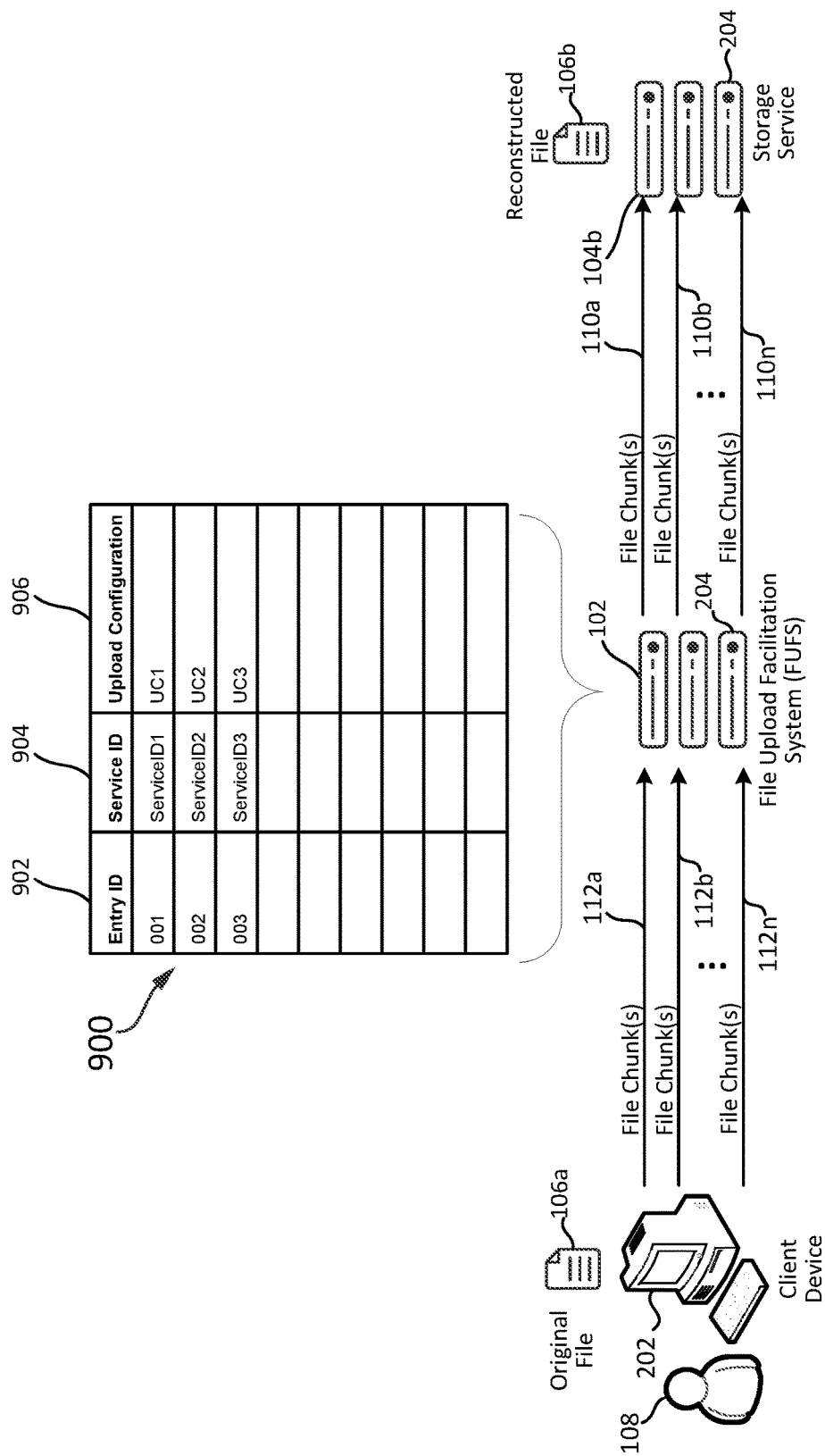
FIG. 10 shows how the FUFS shown in FIGS. 1A and 1B may upload portions of a file in parallel to a storage service based on contents of a storage service configuration table in accordance with some aspects of the present disclosure.

FIG. 11 further shows examples of specific entries that may be written to the storage service configuration table 900 shown in FIGS. 9 and 10. As described in more detail below in connection with FIGS. 9 and 10, the FUFS 102 may determine that the storage service 104 is to receive portions of the file (e.g., chunks of the file 106) from the FUFS 102 via a single HTTP connection (e.g., the HTTP connection 110) or a plurality of HTTP connections (e.g., the plurality of HTTP connections 110a, 110b, etc.) based on the storage service configuration table 900. For example, as seen in FIG. 11, for the first row of entries, i.e., the row for which the "entry id" is "001," the FUFS 102 may reference the value of the "upload configuration" entry 906 in that row (i.e., "sequential") to determine that, for the storage service 104 indicated by the corresponding "service ID" entry 904 (i.e., "OneDrive"), the FUFS 102 is to send the portions of the file (e.g., the chunks of the file 106) sequentially via a single HTTP connection (e.g., the HTTP connection 110).

As another example, as seen in FIG. 11, for the second row of entries, i.e., the row for which the "entry ID" is "002," the FUFS 102 may reference the value of the "upload configuration" entry 906 in that row (i.e., "parallel") to determine that, for the storage service 104 indicated by the corresponding "service ID" entry 904 (i.e., "GoogleDrive"), the FUFS 102 is to send the portions of the file (e.g., the chunks of the file 106) via a plurality of HTTP connections (e.g., the plurality of HTTP connections 110a, 110b, etc.).

Similar to FIG. 1A, FIGS. 9 and 10 each show the FUFS 102 receiving portions of the first file (e.g., chunks of the file 106) from a client device 202 via a plurality of HTTP connections 112 between the FUFS 102 and the client device 202. FIG. 9 illustrates a first example scenario in which the FUFS 102 determined (e.g., based on the "upload configuration" entry for a first storage service 104a), that the first storage service 104a was to receive portions of the file (e.g., chunks of the file 106) from the FUFS 102 via a single HTTP connection (e.g., the HTTP connection 110). FIG. 10, on the other hand, illustrates a second example scenario in which the FUFS 102 determined (e.g., based on the "upload configuration" entry for a second storage service 104b) that the second storage service 104b was to receive portions of the file (e.g., chunks of the file 106) from the FUFS 102 via a plurality of HTTP connections (e.g., the plurality of HTTP connections 110a, 110b, etc.). As noted in Section A, for the scenario illustrated in FIG. 10, in which portions of the first file (e.g., chunks of the file 106) are sent to the storage service 104b via the plurality of HTTP connections 110a, 110b, etc., the FUFS 102 may act as a pass-through for the client device 202, with the FUFS 102 forwarding portions of the first file (e.g., the chunks of the file 106) to the storage service 104b as soon as they are received from the client device 202, i.e., without waiting until the next chunk in the sequence becomes available.

FIG. 6 shows an example upload session object 600 that may be employed by the FUFS 102. As illustrated, in some implementations, the upload session object 600 may include a "session ID" entry 602, a "service ID" entry 604, a "content list" entry 606, a "next expected starting byte" entry 608, a "file size" entry 610, and an "upload status" entry 612.

In some implementations, the "session ID" entry 602 may be a unique identifier assigned by the FUFS 102 to the particular upload session.

In some implementations, the "service ID" entry 604 may indicate the storage service 104 to which the FUFS 102 is to upload the file. In some implementations, the FUFS 102 may determine values for the "service ID" entries 604 using identifiers of storage services 104 that are included in file upload requests that are received from the client device 202.

In some implementations, the "content list" entry 606 may include a vector (e.g., a content list 800—shown in FIG. 8) comprising a plurality of partial file content records 124 (shown in FIG. 7). As noted previously, individual partial file content records 124 in the content list 800 may represent respective portions of the file (e.g., chunks of the file 106) received by the FUFS 102 from the client device 202.

In some implementations, the "next expected starting byte" entry 608 may indicate the starting byte of the next portion of the file (e.g., the next chunk of the file 106) that is to be uploaded from the FUFS 102 to the storage service 104. In some implementations, the "next expected starting byte" entry 608 may be initialized to "0" or "1." In some implementations, each time the FUFS 102 sends a portion of the file (e.g., a chunk of the file 106) to the storage service 104, the FUFS 102 may update the "next expected starting byte" entry 608 to be "1" greater than the end index (e.g., per the "end index" entry 806 in the content list 800) of that portion of the file.

In some implementations, the "file size" entry 610 may indicate the size of the file (e.g., the file 106) that the FUFS 102 is to receive from the client device 202 and upload to the storage service 104. The size of the file may, for example, be represented in bytes. In some implementations, the FUFS 102 may determine a value for the "file size" entry 610 using the file size included in the file upload request received from the client device 202.

In some implementations, the "upload status" entry 612 may indicate the current status of the upload of the file (e.g., the file 106) from the FUFS 102 to the storage service 104. For example, the upload status may be "in progress," "complete," or "error."

FIG. 5 shows an example upload session object table 500 that may employed by the FUFS 102. As shown, in some implementations, the upload session object table 500 may include an "entry ID" entry 502, an "upload session object" entry 504, and an "upload status" entry 506.

In some implementations, the "entry ID" entries 502 may serve to uniquely identify rows of the upload session object table 500.

In some implementations, the "upload session object" entries 504 may include various upload session objects 600 (shown in FIG. 6) for uploads of respective files (e.g., the file 106) to a storage service 104. In some implementations, the upload session objects 600 may be listed in the upload session object table 500 in the order they were created. In other implementations, the upload session objects 600 may be listed in the upload session object table 500 in an order based on some other criterion, such as the values of the respective "session ID" entries 602 for the upload session objects 600.

In some implementations, the "upload status" entry 506 may indicate the current status of the upload of the file (e.g., the file 106) from the FUFS 102 to the storage service 104 for that particular upload session object 600. For example, the upload status may be "in progress," "complete," or "error."

FIG. 7 shows an example partial file content record 124 that may be created by the FUFS 102 based on a message payload 114 (shown in FIG. 1B) received from a client device 202. As shown, in some implementations, the partial file content record 124 may include a "start index" entry 126, an "end index" entry 128, and a "content" entry 130.

In some implementations, the "start index" entry 126 of the partial file content record 124 may indicate a position of the initial byte of the portion of the file (e.g., a chunk of the file 106) relative to the first byte of the file 106. In some implementations, the FUFS 102 may determine the "start index" entry 126 using an indication (e.g., an indication 118) of the starting byte of the portion of the file (e.g., a chunk of the file 106) that was included in a message payload (e.g., the message payload 114 shown in FIG. 1B) received from the client device 202.

In some implementations, the "end index" entry 128 of the partial file content record 124 may indicate a position of the last byte of the portion of the file (e.g., the chunk of the file 106) relative to the first byte of the file 106. In some implementations, the FUFS 102 may determine the "end index" entry 128 using an indication (e.g., an indication 120) of the ending byte of the portion within the file (e.g., the chunk of the file 106) that was included in a message payload (e.g., the message payload 114 shown in FIG. 1B) received from the client device 202.

In some implementations, the "content" entry 130 of the partial file content record 124 may represent the content included in the portion of the file (e.g., the chunk of the file 106) received by the FUFS 102 from the client device 202. In some implementations, the FUFS 102 may determine the "content" entry 130 using data (e.g., content 122) representing the portion of the file (e.g., the chunk of the file 106) that was included in a message payload (e.g., the message payload 114 shown in FIG. 1B) received from the client device 202.

Figure 8:
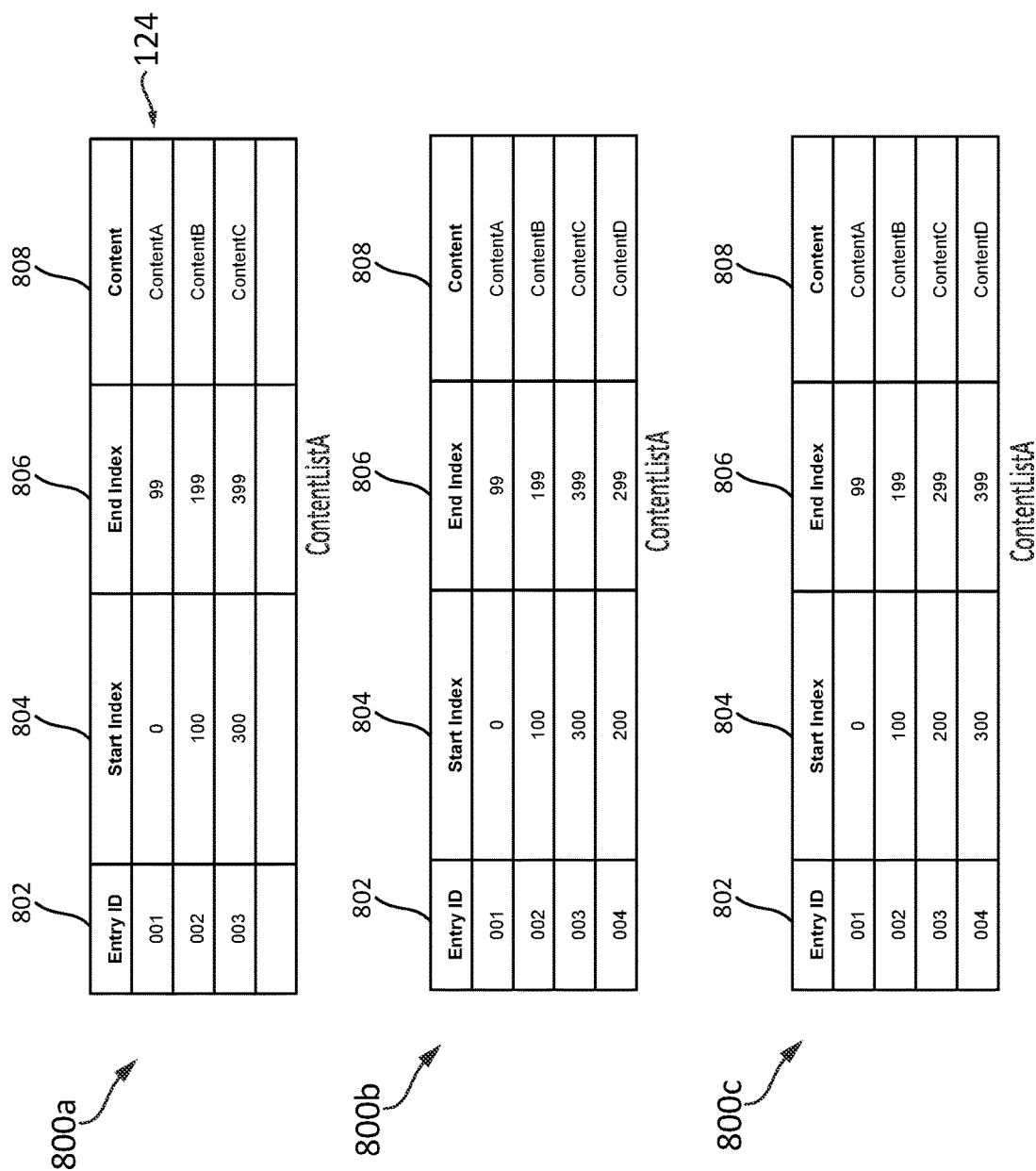
FIG. 8 shows an example process for reordering a content list of an upload session object shown in FIG. 6.

FIG. 8 shows several versions 800a, 800b, 800c of an example content list 800 that may be employed by the FUFS 102. As shown, in some implementations, the content list 800 may include an ordered list of partial file content records 124. In some implementations, for example, the content list 800 may include a list of partial file content records 124 that is ordered sequentially based on values of the "start index" entries 804. In some implementations, the content list 800 may re-order the list of partial file content records 124 in response to a new partial file content record 124 being added to the content list 800.

As mentioned above, in some implementations, the FUFS 102 may store the upload session object 600 (shown in FIG. 6) for a to-be-uploaded file 106 in storage. In some implementations, the FUFS 102 may store the upload session object 600 in an upload session object table 500 (shown in FIG. 5).

FIG. 8 further shows an example process for reordering a content list 800 named "ContentListA." As illustrated at the top of FIG. 8, a version 800a of the content list 800 may initially include three entries corresponding to respective portions of a file (e.g., three chunks of the file 106) received by the FUFS 102, each identified by a separate "entry ID" entry 802. The FUFS 102 may subsequently receive a fourth portion of the file (e.g., a fourth chunk of the file 106) and may add a fourth entry to the content list 800 corresponding to the fourth portion of the file, as indicated by the row of the version 800b of the content list 800 (in the middle of FIG. 8) that has the "entry ID" value of "004." In response to adding the fourth entry to the content list 800, the FUFS 102 may cause the version 800b of the content list 800 to be re-ordered (e.g., based on the relative values of the "start index" entries 804) to generate the version 800c of the content list 800 (shown at the bottom of FIG. 8).

Figure 12:
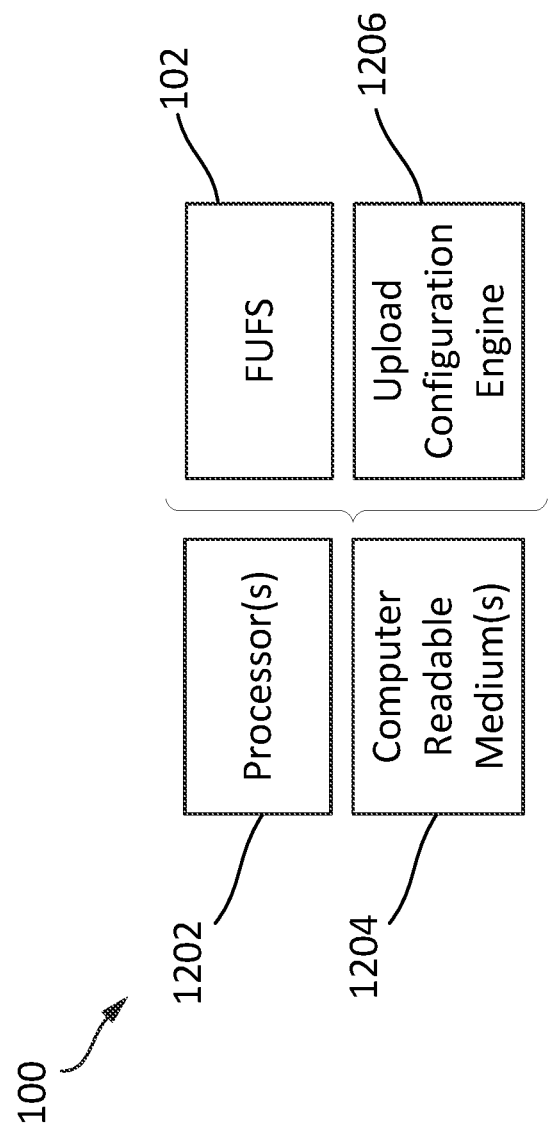
FIG. 12 shows an example implementation of certain components of the system shown in FIGS. 1A and 1B.

As shown in FIG. 12, in some implementations, the system 100 may include one or more processors 1202 and one or more computer readable mediums 1204 that may be encoded with instructions which, when executed by the processor(s) 1202 may implement the functionality of the FUFS 102 (described above) as well as an upload configuration engine 1206 (described below). As explained in more detail below, in some implementations, the upload configuration engine 1206 may be used to determine whether the storage service 104 supports a parallel upload of portions of a file (e.g., chunks of the file 106), based on input provided by a system administrator or application developer.

Figure 13:
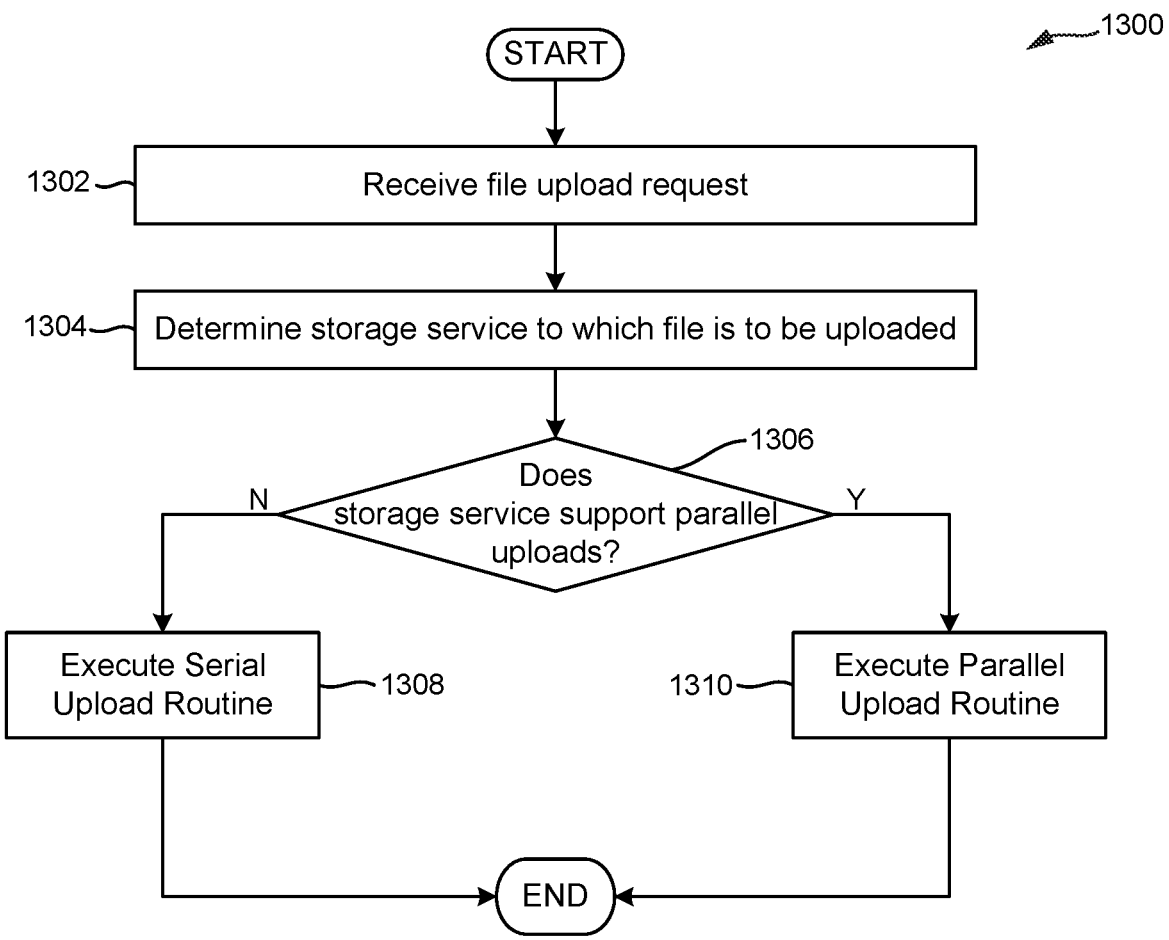
FIG. 13 shows an example routine that may be executed by the FUFS shown in FIGS. 1A and 1B to enable a client device to upload a file to a storage service via multiple, parallel hypertext transfer protocol (HTTP) connections regardless of whether the storage service itself supports parallel uploads of files in accordance with some embodiments.

FIG. 13 shows an example routine 1300 that may be performed by the FUFS 102. As explained in more detail below, the routine 1300 may enable a client device 202 to upload a file (e.g., the file 106) to a storage service 104 via multiple, parallel HTTP connections (e.g., HTTP connections 112a, 112b, etc.) regardless of whether the storage service 104 itself supports parallel uploads of files.

As shown in FIG. 13, the routine 1300 may begin at a step 1302 when the FUFS 102 receives a file upload request from a client device 202. The FUFS 102 may receive such a file upload request from the client device 202, for example, via a first HTTP connection (e.g., the HTTP connection 112a shown in FIG. 1A) established between the FUFS 102 and the client device 202.

At a step 1304, the FUFS 102 may determine a storage service 104 to which the file is to be uploaded. The FUFS 102 may make this determination, for example, based on information (a service ID 604 corresponding to the storage service 104) that was included in the file upload request it received from the client device 202 (per the step 1302).

At a decision 1306, the FUFS 102 may determine whether the storage service 104 (determined at the step 1304) supports parallel uploads. The FUFS 102 may make this determination, for example, based on the "upload configuration" entry 906 that is associated with the "service ID" of the storage service 104 in the storage service configuration table 900 (shown in FIGS. 9-11).

When, at the decision 1306, the FUFS 102 determines that the storage service 104 does not support parallel uploads, the routine 1300 may proceed to a step/routine 1308 (described below in connection with FIG. 14), pursuant to which the FUFS 102 may act as an intermediary to (A) receive portions of the file (e.g., chunks of the file 106) from the client device 202 via multiple HTTP connections (e.g., HTTP connections 112a, 112b, etc.), and (B) to upload of those portions of the file (e.g., chunks of the file 106) to the storage service 104, in sequence, via a single HTTP connection (e.g., the HTTP connection 110), such as illustrated in FIG. 9. When, on the other hand, the FUFS 102 determines (at the decision 1306) that the storage service 104 does support parallel uploads, the routine 1300 may instead proceed to a step/routine 1310 (described below in connection with FIG. 15), pursuant to which the FUFS 102 may act as a pass-through component to (A) receive portions of the file (e.g., chunks of the file 106) from the client device 202 via multiple HTTP connections (e.g., HTTP connections 112a, 112b, etc.), and (B) to upload of those portions of the file (e.g., chunks of the file 106) to the storage service 104, in parallel, via multiple HTTP connections 110a, 110b, etc., such as illustrated in FIG. 10.

Figure 14:
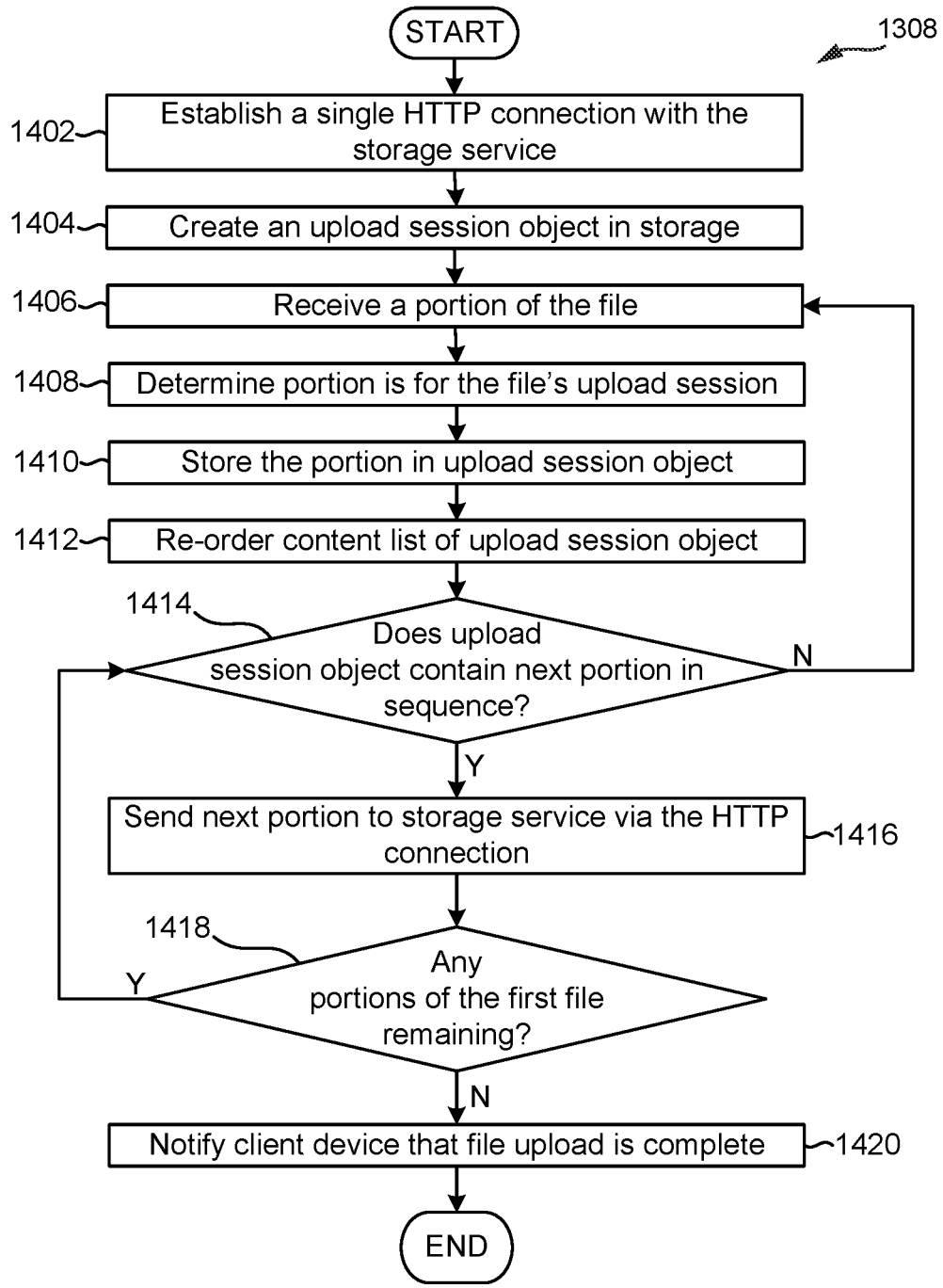
FIG. 14 shows an example implementation of the serial upload routine of the example routine shown in FIG. 13 that may be executed by the FUFS shown in FIGS. 1A and 1B in accordance with some embodiments.

FIG. 14 shows an example implementation of the step/routine 1308 of the routine 1300 (shown in FIG. 13). As shown in FIG. 14, at a step 1402 of the step/routine 1308, the FUFS 102 may establish a single HTTP connection (e.g., the HTTP connection 110) with the storage service 104.

At a step 1404 of the step/routine 1308, the FUFS 102 may create an upload session object 600 in storage (e.g., within the upload session object table 500) for the file (e.g., the file 106). The FUFS 102 may create the upload session object 600, for example, using the service ID 604 and the file size 610 that were indicated in the file upload request that was received from the client device 202 (per step 1302 shown in FIG. 13).

At a step 1406 of the step/routine 1308, the FUFS 102 may receive a portion of the file (e.g., a chunk of the file 106) from the client device 202 via a second HTTP connection (e.g., the HTTP connection 112b) between the FUFS 102 and the client device 202.

At a step 1408 of the step/routine 1308, the FUFS 102 may determine that the portion of the file (e.g., the chunk of the file 106) is part of the upload session of the file (e.g., the file 106). The FUFS 102 may make such a determination, for example, by determining that the portion of the file (e.g., the chunk of the file 106) includes a session ID 116 that corresponds to the session ID 602 for the upload session object 600 for the file (e.g., the file 106) that was created at the step 1404.

At a step 1410 of the step/routine 1308, the FUFS 102 may store the portion of the file (e.g., the chunk of the file 106) in the content list 800 of the upload session object 600. In some implementations, the FUFS 102 may perform this step by creating a partial file content record 124 for the portion of the file (e.g., the chunk of the file 106) and storing the partial file content record 124 in the content list 800 of the upload session object 600.

At a step 1410 of the step/routine 1308, the FUFS 102 may cause the content list 800 of the upload session object 600 to be re-ordered to be in the correct sequence. In some implementations, for example, the FUFS 102 may cause the content list 800 to be re-ordered based on the relative values of the "start index" entries 804 for each partial file content record 124.

At a decision 1414 of the step/routine 1308, the FUFS 102 may determine whether the upload session object 600 for the file (e.g., the file 106) contains the next portion (e.g., chunk) that is to be sent, in sequence, to the storage service 104. The FUFS 102 may make such a determination, for example, by determining whether the value of a "start index" entry 804 in the content list 800 (shown in FIG. 8) corresponds to the value of the "next expected starting byte" entry 608 of the upload session object 600 (shown in FIG. 6) for the file (e.g., the file 106).

When, at the decision 1414, the FUFS 102 determines that the upload session object 600 for the file (e.g., the file 106) does not contain the next portion (e.g., chunk) that is to be sent to the storage service 104, the routine 1300 may return to the step 1406, at which the FUFS 102 may receive another portion of the file (e.g., a chunk of the file 106) from the client device 202. When, on the other hand, the FUFS 102 determines that the upload session object 600 for the file (e.g., the file 106) does contain the next portion (e.g., chunk) that is to be sent to the storage service 104, the routine 1300 may instead proceed to a step 1416, at which the FUFS 102 may send that portion of the file (e.g., the chunk of the file 106) to the storage service 104 via the single HTTP connection (e.g., the HTTP connection 110) between the FUFS 102 and the storage service 104.

At a decision 1418 of the step/routine 1308, the FUFS 102 may determine whether there are any portions of the file (e.g., chunks of the file 106) remaining to be sent to the storage service 104. The FUFS 102 may make such a determination, for example by determining whether the value of the "end index" entry 806 of the last portion of the file (e.g., the last chunk of the file 106) sent to the storage service 104 is equal to the file size 610 of the file (e.g., the file 106). Alternatively, the FUFS 102 may determine whether the value of the "next expected starting byte" entry 608 is greater than the value of the "file size" entry 610 for the file (e.g., the file 106).

When, at the decision 1418, the FUFS 102 determines that there are portions of the file (e.g., chunks of the file 106) remaining to be sent to the storage service 104, the routine 1308 may return to the step 1406, at which the FUFS 102 may receive another portion of the file (e.g., a chunk of the file 106) from the client device 202. When, on the other hand, the FUFS 102 determines that there are not any portions of the file (e.g., chunks of the file 106) remaining to be sent to the storage service 104, the routine 1308 may instead proceed to a step 1420, at which the FUFS 102 may notify the client device 202 that the upload of the file (e.g., the file 106) is complete. After notifying the client device 202 that the upload of the file (e.g., the file 106) is complete, the step/routine 1308 may terminate.

Figure 15:
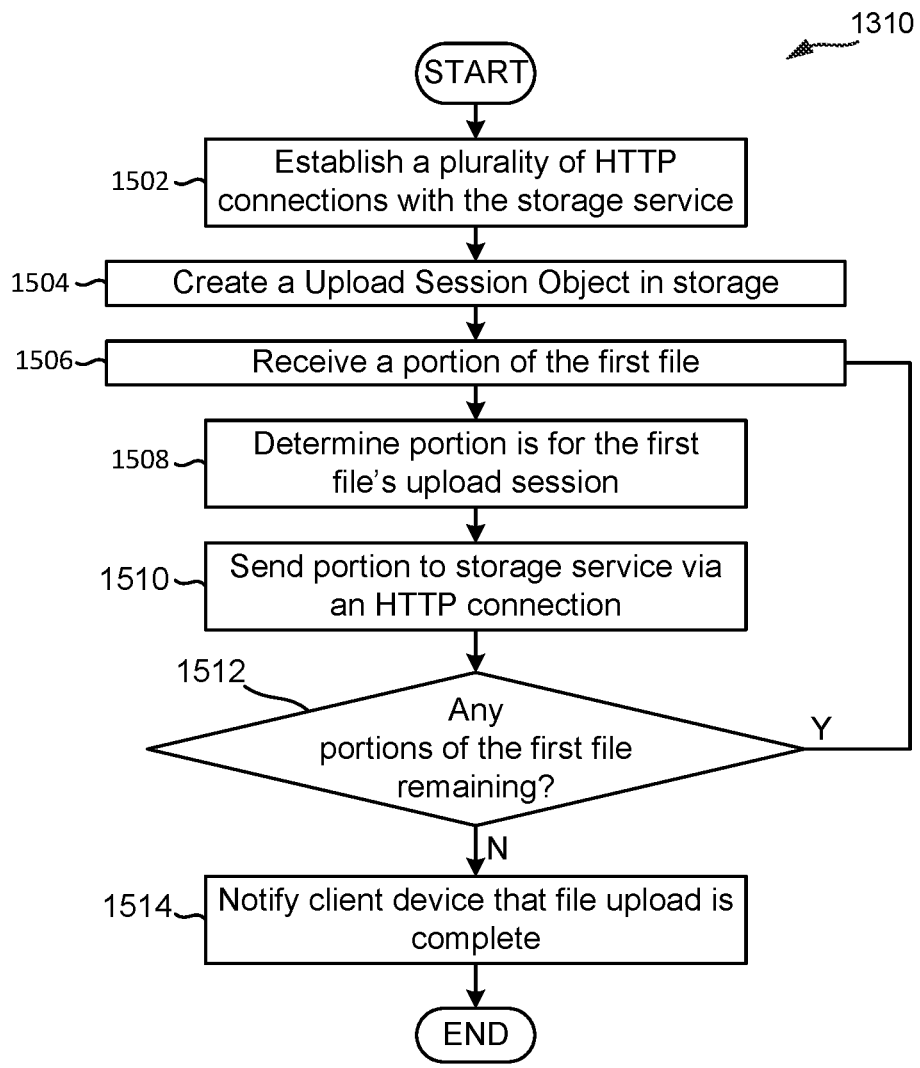
FIG. 15 shows an example implementation of the parallel upload routine of the example routine shown in FIG. 13 that may be executed by the FUFS shown in FIGS. 1A and 1B in accordance with some embodiments.

FIG. 15 show an example implementation of the step/routine 1310 of the routine 1300 (shown in FIG. 13). As shown in FIG. 15, at a step 1502 of the step/routine 1310, the FUFS 102 may establish a plurality of HTTP connections (e.g., the plurality of HTTP connections 110*a*, 110*b*, etc.) with the storage service 104.

At a step 1504 of the step/routine 1310, the FUFS 102 may create an upload session object 600 in storage (e.g., within the upload session object table 500) for the file (e.g., the file 106). The FUFS 102 may create the upload session object 600, for example, using the service ID 604 and the file size 610 that were indicated in the file upload request that was received from the client device 202 (per step 1302 of FIG. 13).

At a step 1506 of the step/routine 1310, the FUFS 102 may receive a portion of the file (e.g., a chunk of the file 106) from the client device 202 via a second HTTP connection (e.g., the HTTP connection 112*b*) between the FUFS 102 and the client device 202.

At a step 1508 of the step/routine 1310, the FUFS 102 may determine that the portion of the file (e.g., the chunk of the file 106) is part of the upload session of the file (e.g. the file 106). The FUFS 102 may make such a determination, for example, by determining that the portion of the file (e.g., the chunk of the file 106) includes a session ID 116 that corresponds to the session ID 602 for the upload session object 600 for the file (e.g., the file 106) that was created at the step 1504.

At a step 1510 of the step/routine 1310, the FUFS 102 may send the portion of the file (e.g., the chunk of the file 106) to the storage service 104 via one of the plurality of HTTP connections (e.g., one of the plurality of HTTP connections 110*a*, 110*b*, etc.) between the FUFS 102 and the storage service 104.

At a decision 1512 of the step/routine 1310, the FUFS 102 may determine whether there are any portions of the file (e.g., chunks of the file 106) remaining to be sent to the storage service 104. The FUFS 102 may make such a determination, for example by tracking the portions of the file (e.g., chunks of the file 106) that have been sent to the storage service 104, e.g., based on the "start index" entries 804 and the "end index" entries 806 in the content list 800 (shown in FIG. 8), and determining whether all of the portions of the file (e.g., chunks of the file 106) have been accounted for. In some implementations, the FUFS 102 may determine highest "end index" entry 806 for the file (e.g., the file 106) that needs to be accounted for by referencing the value of the "file size" entry 610 in the upload session object 600 (shown in FIG. 6) for the file.

When, at the decision 1512, the FUFS 102 determines that there are portions of the file (e.g., chunks of the file 106) remaining to be sent to the storage service 104, the routine 1310 may return to the step 1506, at which the FUFS 102 may receive another portion of the file (e.g., a chunk of the file 106) from the client device 202. When, on the other hand, the FUFS 102 determines that there are not any portions of the file (e.g., chunks of the file 106) remaining to be sent to the storage service 104, the step/routine 1310 may instead proceed to step 1514, at which the FUFS 102 may notify the client device 202 that the upload of the file (e.g., the file 106) is complete. After notifying the client device 202 that the upload of the file (e.g., the file 106) is complete, the step/routine 1310 may terminate.

Figure 16:
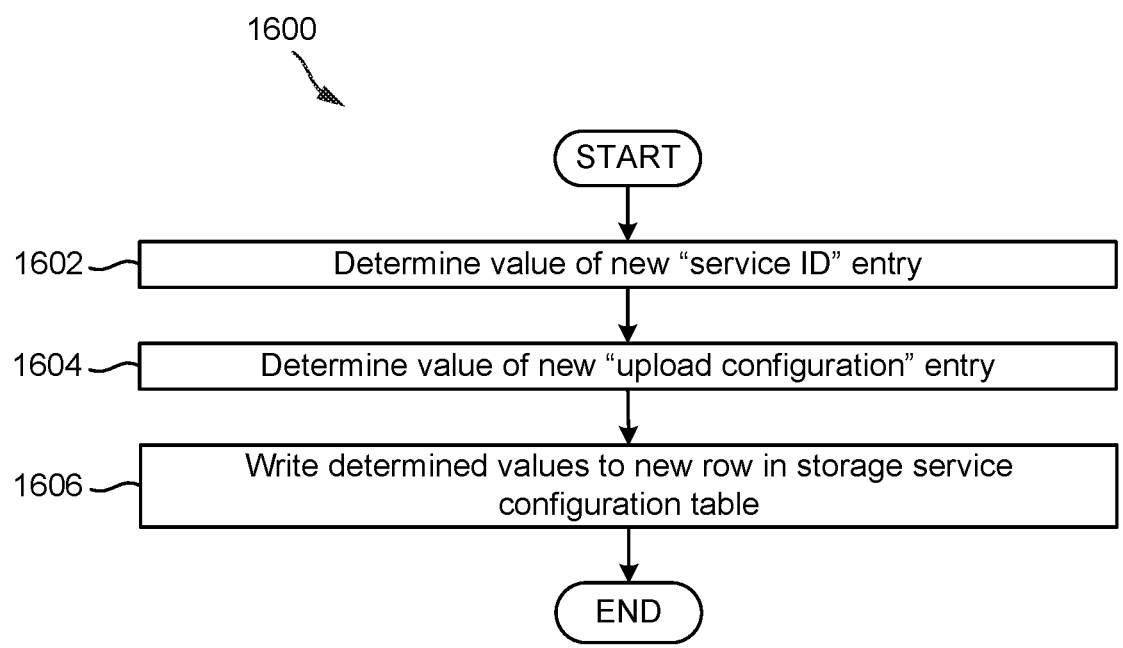
FIG. 16 shows an example routine that may be executed by the upload configuration engine shown in FIG. 12 in accordance with some embodiments.

FIG. 16 shows an example routine 1600 that may be performed by the upload configuration engine 1206 (shown in FIG. 12) to add entries to the storage service configuration table 900, e.g., in response to input by a system administrator, application developer, etc. For example, in some implementations, the upload configuration engine 1206 may enable a system administrator to launch a "storage service configuration wizard" or the like that steps the system administrator through a process for specifying values to add to the storage service configuration table 900, thus allowing the system administrator to customize how the FUFS 102 is to function with respect to different storage services 104.

As shown in FIG. 16, the routine 1600 may begin at a step 1602, at which the upload configuration engine 1206 may determine a value of a new "service ID" entry 904, e.g., as specified by the system administrator, application developer, or otherwise, as described above.

At a step 1604 of the routine 1600, the upload configuration engine 1206 may determine a value of a new "upload configuration" entry 906, e.g., as specified by the system administrator, application developer, or otherwise, as described above.

Finally, at a step 1606 of the routine 1600, the upload configuration engine 1206 may write the values determined at the steps 1602 and 1604 as a new row to the storage service configuration table 900 (shown in FIGS. 9-11). As noted above, in some implementations, such a newly-added row may be indexed by a unique "entry ID" entry 902, so as to differentiate it from the other rows of the storage service configuration table 900.

F. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves determining, by a computing system, that a target service is to receive portions of a first file in a particular sequence from the computing system via a first hypertext transport protocol (HTTP) connection between the computing system and the target service; receiving, by the computing system, a first portion of the first file from a client device via a second HTTP connection established between the computing system and the client device; determining, by the computing system, that the first portion of the first file is next in the particular sequence of file portions to be sent to the target service; sending, from the computing system to the target service via the first HTTP connection, the first portion of the first file based at least in part on the first portion of the first file being next in the particular sequence; receiving, by the computing system, a second portion of the first file from the client device via a third HTTP connection established between the computing system and the client device; determining, by the computing system, that the second portion of the first file is next in the particular sequence; and sending, from the computing system to the target service via the first HTTP connection, the second portion of the first file based at least in part on the second portion of the first file being next in the particular sequence.

(M2) A method may be performed as described in paragraph (M1), and may further involve storing the first portion of the first file in a first position in a storage of the computing system, based at least in part on the particular sequence; and storing the second portion of the first file in a second position in the storage, based at least in part on the particular sequence.

(M3) A method may be performed as described in paragraph (M1) or paragraph (M2), and may further involve receiving, by the computing system and from the client device, a request to send the portions of the first file to the computing system, the request comprising first data indicative of a size of the first file and second data indicative of a target destination for the first file.

(M4) A method may be performed as described in any of paragraphs (M1) through (M3), and may further involve receiving, by the computing system and from the client device, third data indicative of a relative position of the first portion within the first file; and receiving, by the computing system and from the client device, fourth data indicative of a relative position of the second portion within the first file.

(M5) A method may be performed as described in paragraph (M4), wherein the first portion of the first file may be determined to be next in the particular sequence based at least in part on the third data, and the second portion of the first file may be determined to be next in the particular sequence based at least in part on the fourth data.

(M6) A method may be performed as described in any of paragraphs (M1) through (M5), and may further involve determining, by the computing system, a first connection capability of the target service, wherein determining that the target service is to receive the portions of the first file in the particular sequence may be based at least in part on the first connection capability of the target service.

(M7) A method may be performed as described in any of paragraphs (M1) through (M6), and may further involve determining, by the computing system, that a second target service is to receive portions of a second file from the computing system via a plurality of HTTP connections between the computing system and the second target service.

(M8) A method may be performed as described in paragraph (M7), and may further involve sending, from the computing system to the second target service, a first portion of the second file via a fourth HTTP connection between the computing system and the second target service; and sending, from the computing system to the second target service, a second portion of the second file via a fifth HTTP connection between the computing system and the second target service.

(M9) A method may be performed as described in any of paragraphs (M1) through (M8), and may further involve generating, by the computing system, a session identifier corresponding to the first file; determining, by the computing system, that the first portion of the first file is associated with the session identifier; determining, by the computing system, that the first portion of the first file is associated with the first file based at least in part on the first portion of the first file being associated with the session identifier; determining, by the computing system, that the second portion of the first file is associated with the session identifier; and determining, by the computing system, that the second portion of the first file is associated with the first file based at least in part on the second portion of the first file being associated with the session identifier.

The following paragraphs (S1) through (S9) describe examples of systems and devices that may be implemented in accordance with the present disclosure.

(S1) A computing system may include at least one processor, and at least one computer-readable medium encoded with instructions which, when executed by the at least one processor, cause the computing system to determine that a target service is to receive portions of a first file in a particular sequence from the computing system via a first hypertext transport protocol (HTTP) connection between the computing system and the target service, to receive a first portion of the first file from a client device via a second HTTP connection established between the computing system and the client device, to determine that the first portion of the first file is next in the particular sequence of file portions to be sent to the target service, to send, to the target service via the first HTTP connection, the first portion of the first file based at least in part on the first portion of the first file being next in the particular sequence, to receive a second portion of the first file from the client device via a third HTTP connection established between the computing system and the client device, to determine that the second portion of the first file is next in the particular sequence, and to send, to the target service via the first HTTP connection, the second portion of the first file based at least in part on the second portion of the first file being next in the particular sequence.

(S2) A computing system may be configured as described in paragraph (S1), wherein the at least one computer-readable medium may be further encoded with additional instructions which, when executed by the at least one processor, further cause the computing system to store the first portion of the first file in a first position in a storage of the computing system, based at least in part on the particular sequence, and to store the second portion of the first file in a second position in the storage, based at least in part on the particular sequence.

(S3) A computing system may be configured as described in paragraph (S1) or paragraph (S2), wherein the at least one computer-readable medium may be further encoded with additional instructions which, when executed by the at least one processor, further cause the computing system to receive from the client device, a request to send the portions of the first file to the computing system, the request comprising first data indicative of a size of the first file and second data indicative of a target destination for the first file.

(S4) A computing system may be configured as described in any of paragraphs (S1) through (S3), wherein the at least one computer-readable medium may be further encoded with additional instructions which, when executed by the at least one processor, further cause the computing system to receive, from the client device, third data indicative of a relative position of the first portion within the first file, and to receive, from the client device, fourth data indicative of a relative position of the second portion within the first file.

(S5) A computing system may be configured as described in paragraph (S4), wherein the first portion of the first file may be determined to be next in the particular sequence based at least in part on the third data, and the second portion of the first file may be determined to be next in the particular sequence based at least in part on the fourth data.

(S6) A computing system may be configured as described in any of paragraphs (S1) through (S5), wherein the at least one computer-readable medium may be further encoded with additional instructions which, when executed by the at least one processor, further cause the computing system to determine a first connection capability of the target service, and to determine that the target service is to receive the portions of the first file in the particular sequence based at least in part on the first connection capability of the target service.

(S7) A computing system may be configured as described in any of paragraphs (S1) through (S6), wherein the at least one computer-readable medium may be further encoded with additional instructions which, when executed by the at least one processor, further cause the computing system to determine that a second target service is to receive portions of a second file from the computing system via a plurality of HTTP connections between the computing system and the second target service.

(S8) A computing system may be configured as described in paragraph (S7), wherein the at least one computer-readable medium may be further encoded with additional instructions which, when executed by the at least one processor, further cause the computing system to send, to the second target service, a first portion of the second file via a fourth HTTP connection between the computing system and the second target service, and to send, to the second target service, a second portion of the second file via a fifth HTTP connection between the computing system and the second target service.

(S9) A computing system may be configured as described in any of paragraphs (S1) through (S8), wherein the at least one computer-readable medium may be further encoded with additional instructions which, when executed by the at least one processor, further cause the computing system to generate a session identifier corresponding to the first file, to determine that the first portion of the first file is associated with the session identifier, to determine that the first portion of the first file is associated with the first file based at least in part on the first portion of the first file being associated with the session identifier, to determine that the second portion of the first file is associated with the session identifier, and to determine that the second portion of the first file is associated with the first file based at least in part on the second portion of the first file being associated with the session identifier.

The following paragraphs (CRM1) through (CRM9) describe examples of computer-readable media that may be implemented in accordance with the present disclosure.

(CRM1) At least one non-transitory computer-readable medium may be encoded with instructions which, when executed by the at least one processor of a computing system, cause the computing system to determine that a target service is to receive portions of a first file in a particular sequence from the computing system via a first hypertext transport protocol (HTTP) connection between the computing system and the target service, to receive a first portion of the first file from a client device via a second HTTP connection established between the computing system and the client device, to determine that the first portion of the first file is next in the particular sequence of file portions to be sent to the target service, to send, to the target service via the first HTTP connection, the first portion of the first file based at least in part on the first portion of the first file being next in the particular sequence, to receive a second portion of the first file from the client device via a third HTTP connection established between the computing system and the client device, to determine that the second portion of the first file is next in the particular sequence, and to send, to the target service via the first HTTP connection, the second portion of the first file based at least in part on the second portion of the first file being next in the particular sequence.

(CRM2) At least one non-transitory computer-readable medium may be configured as described in paragraph (CRM1), and may be further encoded with additional instructions which, when executed by the at least one processor, further cause the computing system to store the first portion of the first file in a first position in a storage of the computing system, based at least in part on the particular sequence, and to store the second portion of the first file in a second position in the storage, based at least in part on the particular sequence.

(CRM3) At least one non-transitory computer-readable medium may be configured as described in paragraph (CRM1) or paragraph (CRM2), and may be further encoded with additional instructions which, when executed by the at least one processor, further cause the computing system to receive from the client device, a request to send the portions of the first file to the computing system, the request comprising first data indicative of a size of the first file and second data indicative of a target destination for the first file.

(CRM4) At least one non-transitory computer-readable medium may be configured as described in any of paragraphs (CRM1) through (CRM3), and may be further encoded with additional instructions which, when executed by the at least one processor, further cause the computing system to receive, from the client device, third data indicative of a relative position of the first portion within the first file, and to receive, from the client device, fourth data indicative of a relative position of the second portion within the first file.

(CRM5) At least one non-transitory computer-readable medium may be configured as described in paragraph (CRM4), wherein the first portion of the first file may be determined to be next in the particular sequence based at least in part on the third data, and the second portion of the first file may be determined to be next in the particular sequence based at least in part on the fourth data.

(CRM6) At least one non-transitory computer-readable medium may be configured as described in any of paragraphs (CRM1) through (CRM5), and may be further encoded with additional instructions which, when executed by the at least one processor, further cause the computing system to determine a first connection capability of the target service, and to determine that the target service is to receive the portions of the first file in the particular sequence based at least in part on the first connection capability of the target service.

(CRM7) At least one non-transitory computer-readable medium may be configured as described in any of paragraphs (CRM1) through (CRM6), and may be further encoded with additional instructions which, when executed by the at least one processor, further cause the computing system to determine that a second target service is to receive portions of a second file from the computing system via a plurality of HTTP connections between the computing system and the second target service.

(CRM8) At least one non-transitory computer-readable medium may be configured as described in paragraph (CRM7), and may be further encoded with additional instructions which, when executed by the at least one processor, further cause the computing system to send, to the second target service, a first portion of the second file via a fourth HTTP connection between the computing system and the second target service, and to send, to the second target service, a second portion of the second file via a fifth HTTP connection between the computing system and the second target service.

(CRM9) At least one non-transitory computer-readable medium may be configured as described in any of paragraphs (CRM1) through (CRM8), and may be further encoded with additional instructions which, when executed by the at least one processor, further cause the computing system to generate a session identifier corresponding to the first file, to determine that the first portion of the first file is associated with the session identifier, to determine that the first portion of the first file is associated with the first file based at least in part on the first portion of the first file being associated with the session identifier, to determine that the second portion of the first file is associated with the session identifier, and to determine that the second portion of the first file is associated with the first file based at least in part on the second portion of the first file being associated with the session identifier.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining, by a computing system, that a target service is to receive portions of a first file in a particular sequence from the computing system via a first hypertext transport protocol (HTTP) connection between the computing system and the target service;
    receiving, by the computing system, a first portion of the first file from a client device via a second HTTP connection established between the computing system and the client device;
    determining, by the computing system, that the first portion of the first file is next in the particular sequence of file portions to be sent to the target service;
    sending, from the computing system to the target service via the first HTTP connection, the first portion of the first file based at least in part on the first portion of the first file being next in the particular sequence;
    receiving, by the computing system, a second portion of the first file from the client device via a third HTTP connection established between the computing system and the client device;
    determining, by the computing system, that the second portion of the first file is next in the particular sequence;

sending, from the computing system to the target service via the first HTTP connection, the second portion of the first file based at least in part on the second portion of the first file being next in the particular sequence; and determining, by the computing system, that a second target service is to receive portions of a second file from the computing system via a plurality of HTTP connections between the computing system and the second target service.

2. The method of claim 1, further comprising:
storing the first portion of the first file in a first position in a storage of the computing system, based at least in part on the particular sequence; and
storing the second portion of the first file in a second position in the storage, based at least in part on the particular sequence.

3. The method of claim 1, further comprising:
receiving, by the computing system and from the client device, a request to send the portions of the first file to the computing system, the request comprising first data indicative of a size of the first file and second data indicative of a target destination for the first file.

4. The method of claim 3, further comprising:
receiving, by the computing system and from the client device, third data indicative of a relative position of the first portion within the first file; and
receiving, by the computing system and from the client device, fourth data indicative of a relative position of the second portion within the first file.

5. The method of claim 4, wherein:
the first portion of the first file is determined to be next in the particular sequence based at least in part on the third data; and
the second portion of the first file is determined to be next in the particular sequence based at least in part on the fourth data.

6. The method of claim 1, further comprising:
determining, by the computing system, a first connection capability of the target service,
wherein determining that the target service is to receive the portions of the first file in the particular sequence is based at least in part on the first connection capability of the target service.

7. The method of claim 1, further comprising:
sending, from the computing system to the second target service, a first portion of the second file via a fourth HTTP connection between the computing system and the second target service; and
sending, from the computing system to the second target service, a second portion of the second file via a fifth HTTP connection between the computing system and the second target service.

8. The method of claim 1, further comprising:
generating, by the computing system, a session identifier corresponding to the first file;
determining, by the computing system, that the first portion of the first file is associated with the session identifier;
determining, by the computing system, that the first portion of the first file is associated with the first file based at least in part on the first portion of the first file being associated with the session identifier;
determining, by the computing system, that the second portion of the first file is associated with the session identifier; and
determining, by the computing system, that the second portion of the first file is associated with the first file based at least in part on the second portion of the first file being associated with the session identifier.

9. A computing system, comprising:
at least one processor; and
at least one computer-readable medium encoded with instructions which, when executed by the at least one processor, cause the computing system to:
determine that a target service is to receive portions of a first file in a particular sequence from the computing system via a first hypertext transport protocol (HTTP) connection between the computing system and the target service;
receive a first portion of the first file from a client device via a second HTTP connection established between the computing system and the client device;
determine that the first portion of the first file is next in the particular sequence of file portions to be sent to the target service;
send, to the target service via the first HTTP connection, the first portion of the first file based at least in part on the first portion of the first file being next in the particular sequence;
receive a second portion of the first file from the client device via a third HTTP connection established between the computing system and the client device;
determine that the second portion of the first file is next in the particular sequence;
send, to the target service via the first HTTP connection, the second portion of the first file based at least in part on the second portion of the first file being next in the particular sequence; and
determine that a second target service is to receive portions of a second file from the computing system via a plurality of HTTP connections between the computing system and the second target service.

10. The computing system of claim 9, wherein the at least one computer-readable medium is further encoded with additional instructions which, when executed by the at least one processor, further cause the computing system to:
store the first portion of the first file in a first position in a storage of the computing system, based at least in part on the particular sequence; and
store the second portion of the first file in a second position in the storage, based at least in part on the particular sequence.

11. The computing system of claim 9, wherein the at least one computer-readable medium is further encoded with additional instructions which, when executed by the at least one processor, further cause the computing system to:
receive, from the client device, a request to send the portions of the first file to the computing system, the request comprising first data indicative of a size of the first file and second data indicative of a target destination for the first file.

12. The computing system of claim 11, wherein the at least one computer-readable medium is further encoded with additional instructions which, when executed by the at least one processor, further cause the computing system to:
receive, from the client device, third data indicative of a relative position of the first portion within the first file; and receive, from the client device, fourth data indicative of a relative position of the second portion within the first file.

13. The computing system of claim 12, wherein the at least one computer-readable medium is further encoded with additional instructions which, when executed by the at least one processor, further cause the computing system to:
   determine that the first portion of the first file is next in the particular sequence based at least in part on the third data; and
   determine that the second portion of the first file is next in the particular sequence based at least in part on the fourth data.

14. The computing system of claim 9, wherein the at least one computer-readable medium is further encoded with additional instructions which, when executed by the at least one processor, further cause the computing system to:
   determine a first connection capability of the target service; and
   determining that the target service is to receive the portions of the first file in the particular sequence based at least in part on the first connection capability of the target service.

15. The computing system of claim 9, wherein the at least one computer-readable medium is further encoded with additional instructions which, when executed by the at least one processor, further cause the computing system to:
   send, to the second target service, a first portion of the second file via a fourth HTTP connection between the computing system and the second target service; and
   send, to the second target service, a second portion of the second file via a fifth HTTP connection between the computing system and the second target service.

16. The computing system of claim 9, wherein the at least one computer-readable medium is further encoded with additional instructions which, when executed by the at least one processor, further cause the computing system to:
   generate a session identifier corresponding to the first file;
   determine that the first portion of the first file is associated with the session identifier;
   determine that the first portion of the first file is associated with the first file based at least in part on the first portion of the first file being associated with the session identifier;
   determine that the second portion of the first file is associated with the session identifier; and
   determine that the second portion of the first file is associated with the first file based at least in part on the second portion of the first file being associated with the session identifier.

17. At least one non-transitory computer-readable medium encoded with instructions which, when executed by at least one processor of a computing system, cause the computing system to:
   determine that a target service is to receive portions of a first file in a particular sequence from the computing system via a first hypertext transport protocol (HTTP) connection between the computing system and the target service;
   receive a first portion of the first file from a client device via a second HTTP connection established between the computing system and the client device;
   determine that the first portion of the first file is next in the particular sequence of file portions to be sent to the target service;
   send, to the target service via the first HTTP connection, the first portion of the first file based at least in part on the first portion of the first file being next in the particular sequence;
   receive a second portion of the first file from the client device via a third HTTP connection established between the computing system and the client device;
   determine that the second portion of the first file is next in the particular sequence;
   send, to the target service via the first HTTP connection, the second portion of the first file based at least in part on the second portion of the first file being next in the particular sequence; and
   determine that a second target service is to receive portions of a second file from the computing system via a plurality of HTTP connections between the computing system and the second target service.

18. The at least one non-transitory computer-readable medium of claim 17, further encoded with additional instructions which, when executed by the at least one processor, further cause the computing system to:
   store the first portion of the first file in a first position in a storage of the computing system, based at least in part on the particular sequence; and
   store the second portion of the first file in a second position in the storage, based at least in part on the particular sequence.

* * * * *